US012766703B2

(12) United States Patent
Deemyad et al.

(10) Patent No.: US 12,766,703 B2
(45) Date of Patent: Oct. 20, 2026

(54) DRONE MECHANISM INCLUDING FOLDABLE ARM AND COMPRESSIBLE GRIPPER

(71) Applicant: IDAHO STATE UNIVERSITY, Pocatello, ID (US)

(72) Inventors: Taher Deemyad, Pocatello, ID (US); Kyler Bingham, Idaho Falls, ID (US); Matthew Hessler, Denver, CO (US); Safal Lama, Pocatello, ID (US); Christopher Zakrevski, Idaho Falls, ID (US)

(73) Assignee: IDAHO STATE UNIVERSITY, Pocatello, ID (US)

( * ) Notice: Subject to any disclaimer, the term of this patent is extended or adjusted under 35 U.S.C. 154(b) by 197 days.

(21) Appl. No.: 18/768,507

(22) Filed: Jul. 10, 2024

(65) Prior Publication Data

US 2025/0026006 A1 Jan. 23, 2025

Related U.S. Application Data

(60) Provisional application No. 63/644,579, filed on May 9, 2024, provisional application No. 63/514,467, filed on Jul. 19, 2023.

(51) Int. Cl.

| | |
|---|---|
| ***B25J 9/10*** | (2006.01) |
| ***B25J 15/02*** | (2006.01) |
| ***B64U 60/50*** | (2023.01) |
| *B64U 101/00* | (2023.01) |

(52) U.S. Cl.

CPC ........... *B25J 9/107* (2013.01); *B25J 15/0213* (2013.01); *B64U 60/50* (2023.01); *B64U 2101/00* (2023.01)

(58) Field of Classification Search

CPC ....... B25J 9/107; B25J 15/0213; B64U 60/50; B64U 2101/00; B64U 2101/64; B64U 2101/66

USPC ........................................ 244/137.1; 294/104

See application file for complete search history.

(56) References Cited

U.S. PATENT DOCUMENTS

| | | | | |
|---|---|---|---|---|
| 7,125,059 | B2 * | 10/2006 | Miyamoto | B25J 15/0206 901/49 |
| 8,011,426 | B1 * | 9/2011 | Orgeron | E21B 19/155 166/85.1 |
| 10,766,617 | B2 * | 9/2020 | Gwin | B25J 9/1095 |
| 11,609,159 | B2 * | 3/2023 | Orol | B64U 80/70 |
| 11,844,341 | B2 * | 12/2023 | Ravanat | A01M 5/02 |
| 2017/0200530 | A1 * | 7/2017 | Davis | B05C 5/00 |
| 2019/0161190 | A1 * | 5/2019 | Gil | H04L 67/55 |
| 2019/0202560 | A1 * | 7/2019 | Bosworth | B25J 15/0028 |

(Continued)

*Primary Examiner* — Paul T Chin

(74) *Attorney, Agent, or Firm* — Dority & Manning, P.A.

(57) ABSTRACT

An unmanned aerial vehicle includes a body. The body has an upper side and a lower side opposite the upper side. At least one rotor is coupled to the body to generate lift in an upward direction. A mechanism is mounted to the lower side of the body. The mechanism includes a landing gear, a storage system, a robotic arm housing, a counterweight housing, a robotic arm, an actuator, and an end effector. The actuator is coupled to the robotic arm to move the robotic arm between a retracted position and an extended position. The end effector is coupled to the distal end of the robotic arm. The end effector includes a gripper with a pair of opposing compressible elements for gripping an object between the pair of compressible elements.

19 Claims, 38 Drawing Sheets

(56) References Cited

U.S. PATENT DOCUMENTS

| | | | | |
|---|---|---|---|---|
| 2019/0389080 | A1* | 12/2019 | Chundi | B25J 9/107 |
| 2020/0148349 | A1* | 5/2020 | Bosworth | B64U 10/16 |
| 2020/0354057 | A1* | 11/2020 | Polus | G06Q 50/40 |
| 2022/0174932 | A1* | 6/2022 | Ravanat | A01G 3/088 |
| 2023/0365280 | A1* | 11/2023 | Deemyad | B64U 30/20 |
| 2025/0376279 | A1* | 12/2025 | Tang | B64U 20/87 |

* cited by examiner

DRONE MECHANISM INCLUDING FOLDABLE ARM AND COMPRESSIBLE GRIPPER

CROSS-REFERENCE TO RELATED APPLICATIONS

This application claims benefit of the filing dates of U.S. Provisional Patent Application Ser. No. 63/514,467, having a filing date of Jul. 19, 2023, and U.S. Provisional Patent Application Ser. No. 63/644,579, having a filing date of May 9, 2024, each of which is incorporated herein by reference for all purposes.

FIELD

The present subject matter relates generally to unmanned aerial vehicles, and more particularly to unmanned aerial vehicles and mechanisms therefor which include an arm and/or end effector.

BACKGROUND

Unmanned aerial vehicles ("UAV"), sometimes also referred to as drones, are used for a variety of tasks. A quadcopter is an example of a UAV. UAVs, such as quadcopters, may be used to perform tasks that are too difficult or too dangerous for humans or ground vehicles to accomplish, such as in harsh environments, locations where terrain is rough and speed is important, or locations high above the ground. For example, UAV's may be used to collect samples, repair power lines, or harvest produce from tall trees.

Providing a UAV with a robotic arm and an end effector, such as a gripper, thereon may enhance the UAV's capabilities for such tasks. Such robotic arms and end effectors may, however, undesirably increase the weight, drag, or power consumption of the UAV.

Accordingly, an improved UAV and mechanisms (e.g., including a robotic arm and/or end effector) therefor with features such as light weight, improved aerodynamics, e.g., when the robotic arm is not deployed, and minimal power consumption, e.g., during actuation, would be useful.

BRIEF DESCRIPTION

Aspects and advantages of the invention will be set forth in part in the following description, or may be apparent from the description, or may be learned through practice of the invention.

In a first exemplary embodiment, a mechanism for an unmanned aerial vehicle is provided. The unmanned aerial vehicle includes a body having an upper side and a lower side opposite the upper side. The unmanned aerial vehicle also includes at least one rotor coupled to the body. The rotor is configured to generate lift in an upward direction. The mechanism is configured to be mounted to the lower side of the body. The mechanism includes a landing gear. The landing gear extends between a pair of skids at a bottom end of the mechanism and a connector at the top end of the mechanism. The connector is configured to couple to the lower side of the body of the unmanned aerial vehicle. The mechanism also includes a storage system coupled to the landing gear proximate the pair of skids. The mechanism further includes a robotic arm housing mounted to the landing gear at a bottom side of the connector. The mechanism also includes a counterweight housing adjacent to the robotic arm housing and a robotic arm movably mounted to the robotic arm housing. The robotic arm is movable between a retracted position wherein the robotic arm is folded within the robotic arm housing and an extended position wherein the robotic arm is unfolded and a distal end of the robotic arm is spaced apart from the robotic arm housing in front of the robotic arm housing. The mechanism further includes an actuator coupled to the robotic arm to move the robotic arm between the retracted position and the extended position and an end effector coupled to the distal end of the robotic arm. The end effector includes a gripper with a pair of opposing compressible elements for gripping an object between the pair of compressible elements.

In a second exemplary embodiment, a mechanism for an unmanned aerial vehicle is provided. The unmanned aerial vehicle includes a body having an upper side and a lower side opposite the upper side. The unmanned aerial vehicle also includes at least one rotor coupled to the body. The rotor is configured to generate lift in an upward direction. The mechanism is configured to be mounted to the lower side of the body. The mechanism includes a landing gear, a storage system, a robotic arm housing, a counterweight housing, a robotic arm, an actuator, and an end effector. The robotic arm is movably mounted to the robotic arm housing. The robotic arm is movable between a retracted position wherein the robotic arm is folded within the robotic arm housing and an extended position wherein the robotic arm is unfolded and a distal end of the robotic arm is spaced apart from the robotic arm housing in front of the robotic arm housing. The actuator is coupled to the robotic arm to move the robotic arm between the retracted position and the extended position. The end effector is coupled to the distal end of the robotic arm. The end effector includes a gripper with a pair of opposing compressible elements for gripping an object between the pair of compressible elements.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
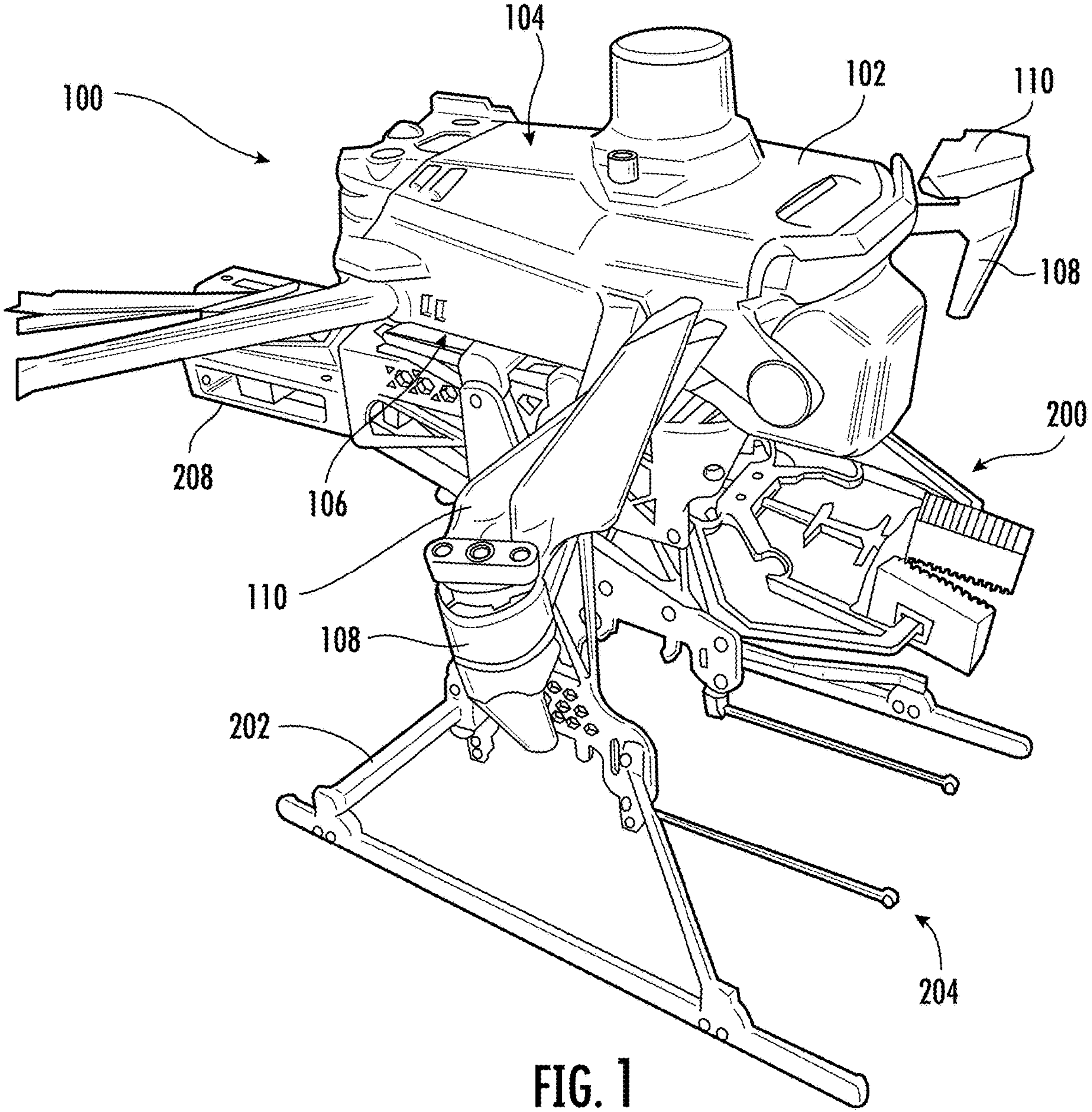
FIG. 1 provides a perspective view of an unmanned aerial vehicle ("UAV") mounted with a mechanism according to one or more embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation such as "generally," "about," or "approximately" include values within ten percent greater or less than the stated value. When used in the context of an angle or direction, such terms include within ten degrees greater or less than the stated angle or direction, e.g., "generally vertical" includes forming an angle of up to ten degrees either clockwise or counterclockwise with the vertical direction V.

The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components.

The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
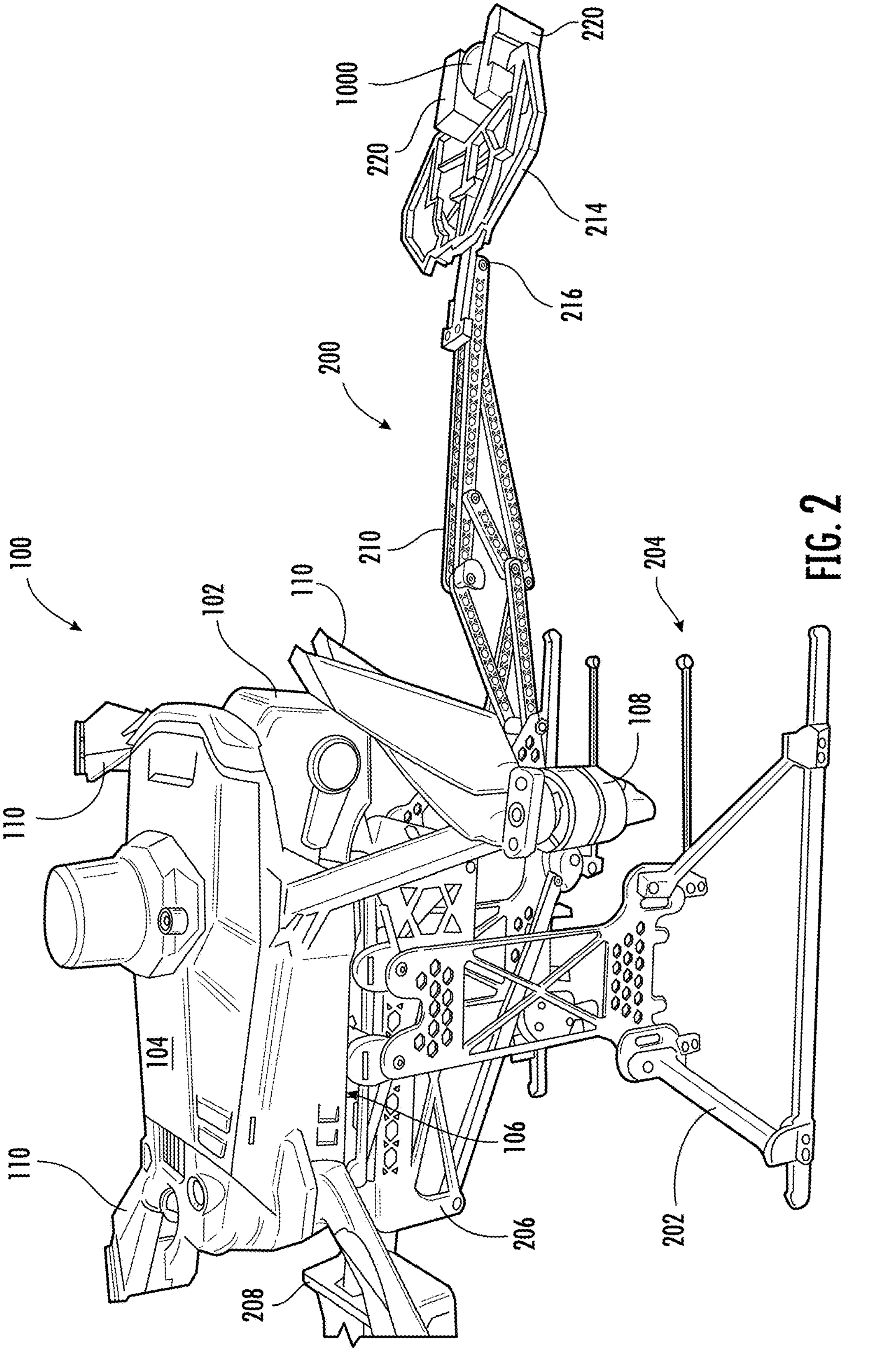
FIG. 2 provides another perspective view of the UAV and mechanism of FIG. 1.

As illustrated for example in FIGS. 1 and 2, embodiments of the present disclosure include unmanned aerial vehicles, such as the exemplary unmanned aerial vehicle 100 illustrated in FIGS. 1 and 2, and mechanisms therefor, such as the exemplary mechanism 200 illustrated, e.g., in FIGS. 1 and 2. Unmanned aerial vehicles may also be referred to as "UAVs" or drones. In particular, the exemplary embodiment of the UAV 100 illustrated in FIGS. 1 and 2 is also known as a quadcopter. In additional embodiments, mechanism 200 as described hereinbelow may be used with any suitable UAV 100, such as a dual rotor UAV, other multirotor UAV (e.g., a tricopter or a multirotor UAV having more than four rotors), single rotor UAV, fixed-wing UAV, or other similar UAVs.

Unmanned aerial vehicles generally include a main body 102 or chassis and one or more lift-generating and/or propulsion (thrust-generating) mechanisms. A UAV further includes one or more controllers, e.g., integrated circuits, including a wireless communication module and antenna for sending and receiving remote commands, instructions, and other information. A UAV may also include a vision system, e.g., comprising a camera, global positioning system (GPS), gyroscopes, and other components or accessories, such as a manipulator, e.g., a robotic arm such as the exemplary robotic arms described hereinbelow, which are communicatively coupled with the controller and may be operated by the controller, e.g., in response to remote commands received wirelessly by the controller.

As may be seen in FIGS. 1 and 2, the UAV 100, e.g., quadcopter 100, may include an upper 104 side and a lower side 106 opposite the upper side 104, such as an upper side 104 of the main body 102 and a lower side 106 of the main body 102. The terms "upper" and "lower" may be defined with respect to each other, e.g., as facing in opposite directions, and with respect to a vertical direction or orientation, e.g., wherein the UAV 100 is operable and configured to move upward along the vertical direction when the lift-generating mechanism is activated. For example, the illustrated quadcopter 100 includes four rotors 108 which generate lift when rotated. As those of ordinary skill in the art will recognize and understand, each rotor 108 includes a propeller 110 coupled to a motor (not shown), and each motor may be controlled, e.g., selectively activated or deactivated and the speed or direction thereof adjusted, by the controller of the UAV 100. By varying the speed of rotation, direction of rotation, or angle of each rotor 108 or at least one rotor 108, the UAV 100 may move horizontally, e.g., in a horizontal direction generally parallel to the ground or generally perpendicular to the vertical direction, due to the varying amount or direction of lift generated by the rotors 108 which are operated at different speeds, rotated in different directions, or at various angles. Such variations across and among the rotors 108 also permit variations in and control of the pitch, yaw, and roll of the UAV 100.

The controller may be generally configured to facilitate UAV operation. In this regard, the lift and/or propulsion mechanism and other components, such as the vision system (if provided) or robotic arm (if provided) may be in communication with the controller such that controller may receive control inputs from user input devices, and may otherwise regulate operation of the UAV 100. For example, signals generated by the controller may activate or operate the UAV 100, including any or all system components, subsystems, or interconnected devices, in response to user inputs and other control commands wirelessly received by the controller. The various components of the UAV 100 may be in communication with the controller via, for example, one or more signal lines or shared communication busses. In this manner, Input/Output ("I/O") signals may be routed between the controller and various operational components of the UAV 100.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate operation of the UAV, such as the vision system may include a dedicated and specialized controller separate from or onboard a main controller, similarly, the robotic arm may also or instead be operated by a dedicated controller. Alternatively, controller 166 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

The controller may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, the controller may be operable to execute programming instructions or micro-control code associated with an operation of the UAV 100. In this regard, the instructions may be software or any set of instructions that when executed by the processing device, cause the processing device to perform operations, such as running one or more software applications, receiving user input, processing user input, etc. Moreover, it should be noted that the controller as disclosed herein is capable of and may be operable to perform any methods, method steps, or portions of methods as disclosed herein. For example, in some embodiments, methods disclosed herein may be embodied in programming instructions stored in the memory and executed by the controller.

The memory devices may also store data that can be retrieved, manipulated, created, or stored by the one or more processors or portions of the controller. The data can include, for instance, data to facilitate performance of methods described herein. The data can be stored locally (e.g., on the controller) in one or more databases and/or may be split up so that the data is stored in multiple locations. In addition, or alternatively, the one or more database(s) can be connected to the controller through any suitable network(s), such as through a high bandwidth local area network (LAN) or wide area network (WAN). In this regard, for example, the controller may further include a communication module or interface that may be used to communicate with one or more other component(s) of the UAV 100, the controller, an external controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

Returning to FIGS. 1 and 2, mechanism 200 may be configured to be mounted to any UAV, such as the exemplary UAV 100. The mechanism 200 may generally include a landing gear 202, a storage system 204, a robotic arm housing 206, a counterweight housing 208, a robotic arm 210, an actuator 250 (FIG. 4), and an end effector 214. End effector 214, e.g., a gripper or any other suitable device which permits interaction with external objects, may be provided at a distal end 216 of the arm 210. For example, the robotic arm 210 may extend from a proximal end 218 (see, e.g., FIG. 17) which is fixedly mounted within the robotic arm housing 206 to the distal end 216. Any of the exemplary end effectors according to the embodiments illustrated in FIGS. 3-40 may be incorporated into the mechanism 200 and mounted to any suitable UAV 100, such as but not limited to the exemplary quadcopter 100 shown in FIGS. 1 and 2. Turning briefly to FIG. 5, the mechanism 200 may extend vertically between a top side 201 and a bottom side 203, and may extend transversely, e.g., along a direction perpendicular to the vertical direction, between a rear side 205 and a front side 207.

Figure 3:
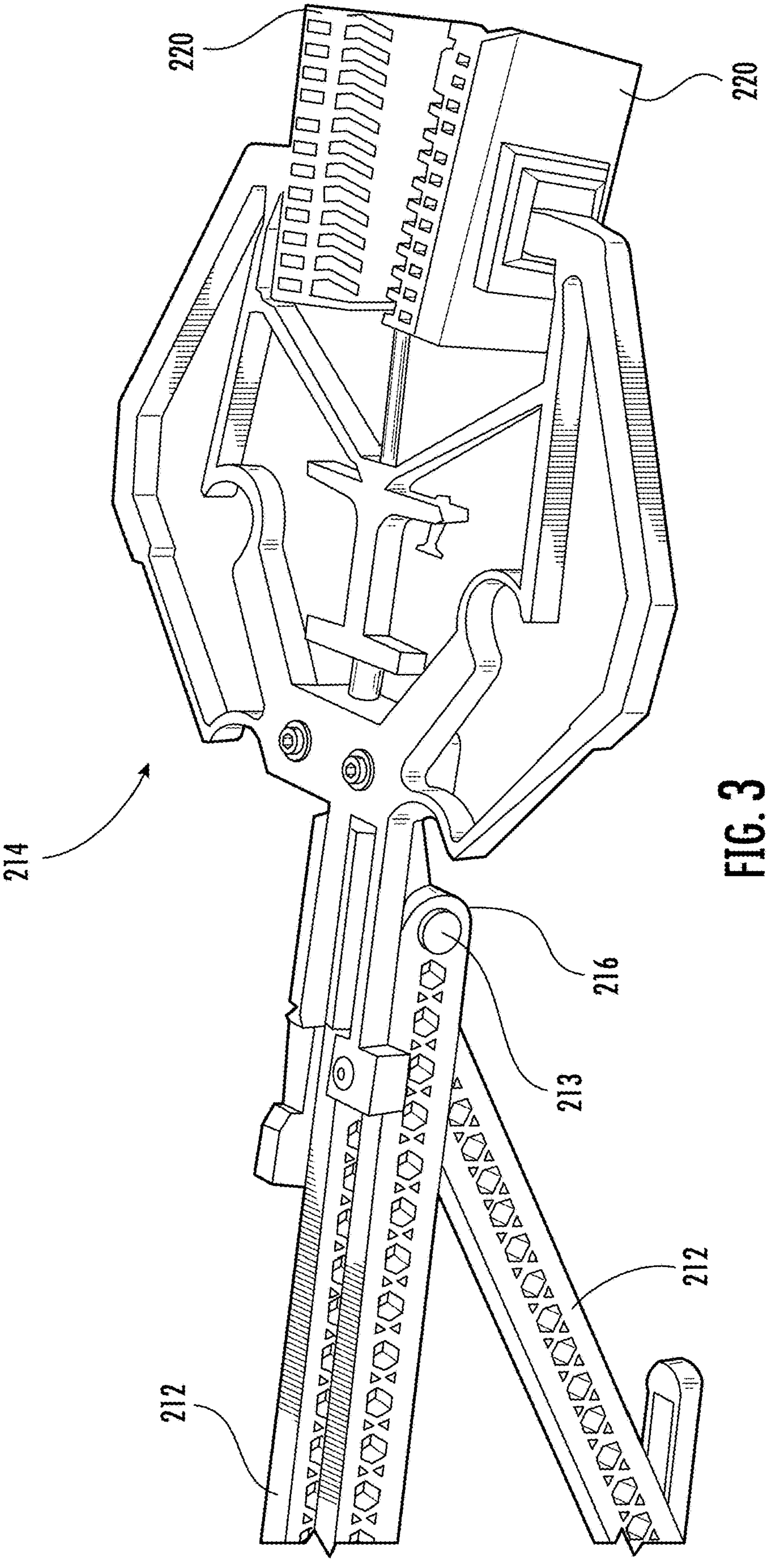
FIG. 3 provides an enlarged view of a portion of the mechanism of FIG. 1 including a distal end of robotic arm and an end effector thereon.

FIG. 3 provides an enlarged view of the end effector 214 as illustrated in FIG. 2. In particular, the end effector 214 depicted in FIG. 3 is a compliant end effector 214, e.g., is comprised of a compliant material, e.g., a rigid plastic material which has spring-like qualities, whereby the compliant end effector may be automatically actuated in a manner similar to a mouse trap, as will be described in further detail below. As may be seen, e.g., in FIGS. 2 and 3, the end effector 214 may include a pair of opposing compressible elements 220 for gripping an object 1000 therebetween.

Figure 4:
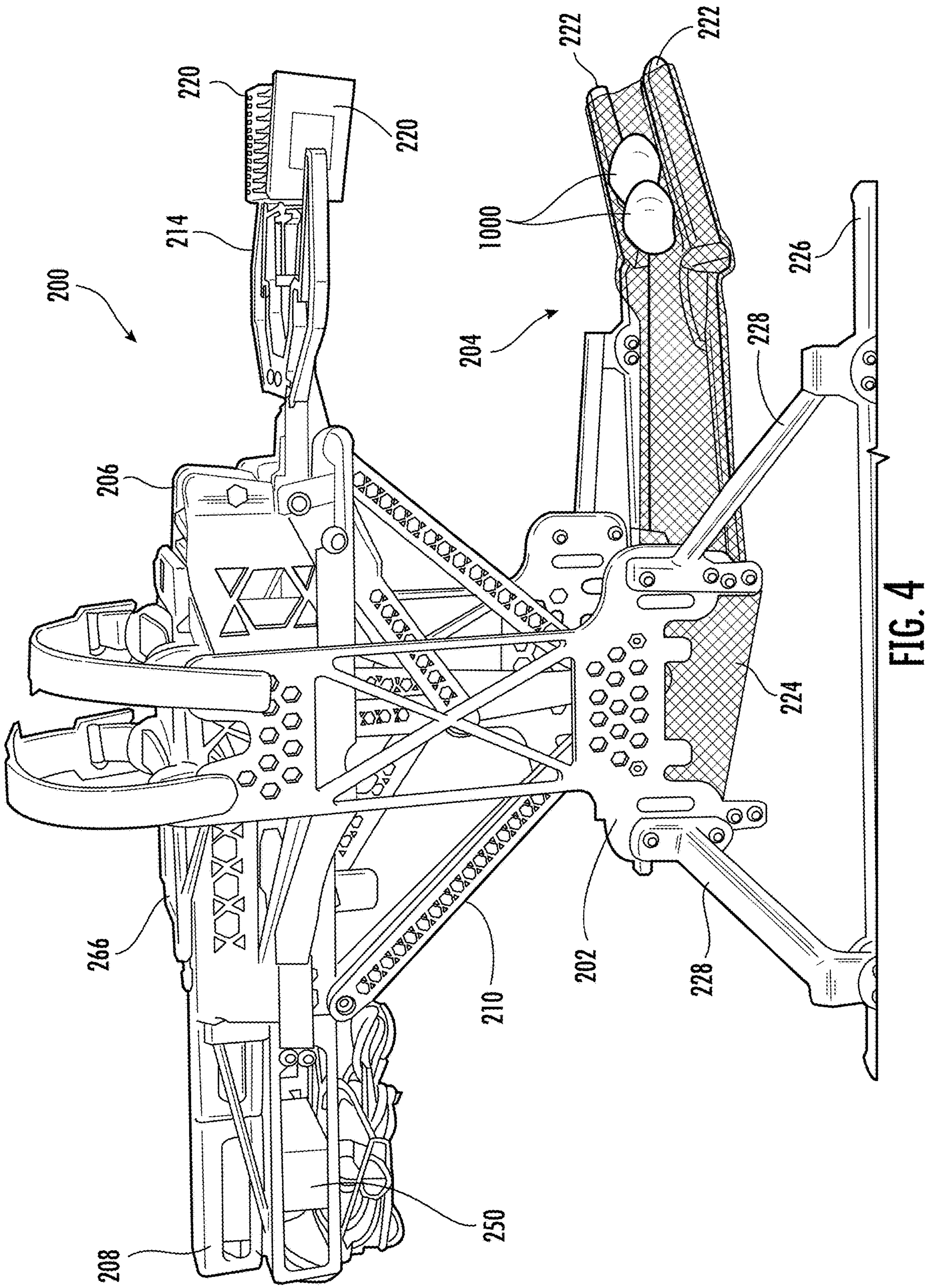
FIG. 4 provides a side view of the mechanism of FIG. 1 with the robotic arm in a retracted position.
Figure 5:
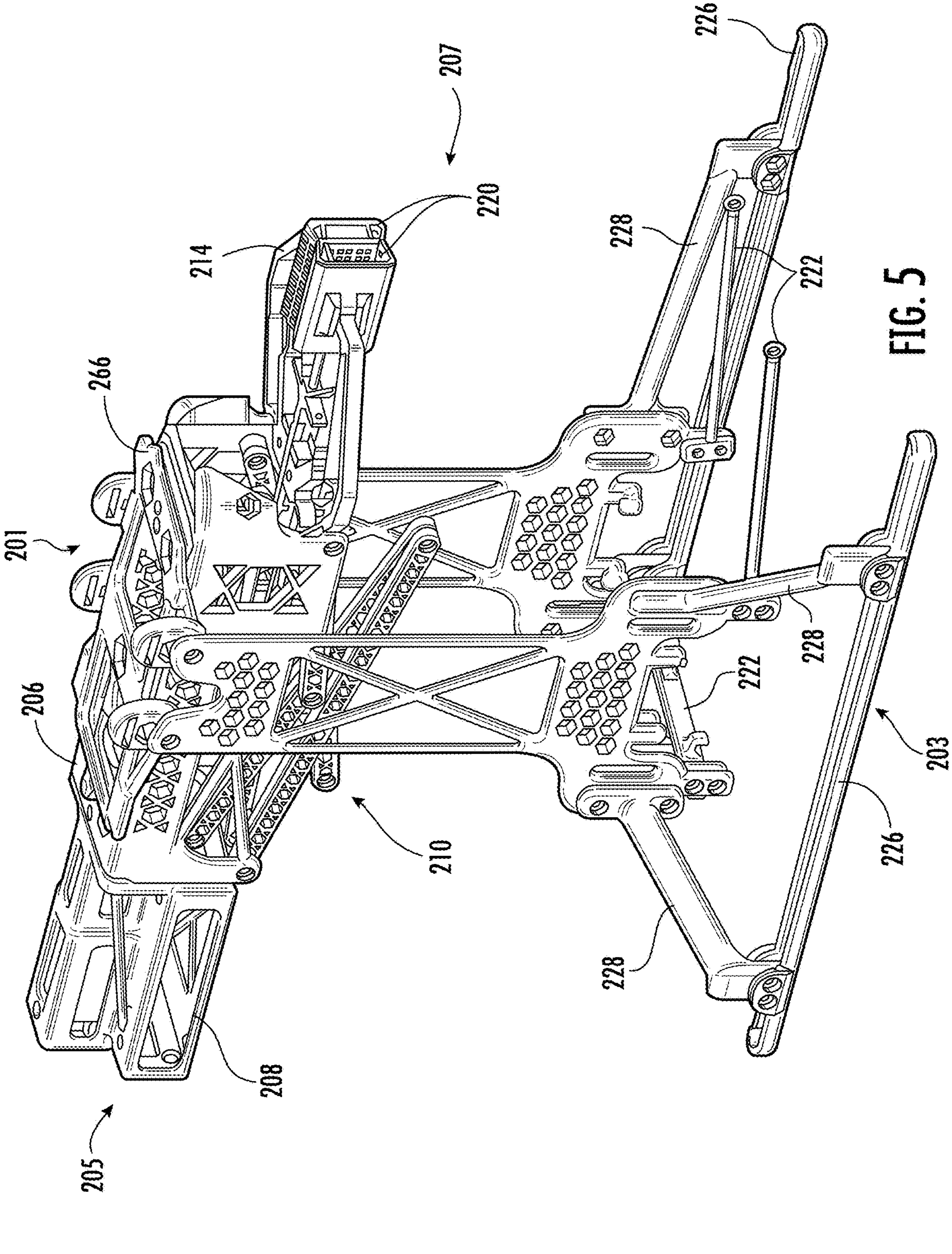
FIG. 5 provides a perspective view of the mechanism of FIG. 1 with the robotic arm in a retracted position.

FIG. 4 provides a side view of the mechanism 200, including the storage system 204 thereof, and objects 1000 contained in the storage system 204. The end effector 214 may, for example, be configured to release or open when the robotic arm 210 retracts, thereby releasing an object held between the compressible elements 220, such that the object falls into the storage system 204. In particular, the storage system 204 may include a frame comprising a plurality of frame members 222 coupled to the landing gear 202 below the robotic arm housing 206 and a net 224 (e.g., or mesh, webbing, or other similar material) mounted on the frame members 222 of the storage system 204. Thus, the object dropped by the end effector 214 when the robotic arm 210 returns to the retracted position may be caught by the storage system 204, e.g., the net 224 thereof, and retained while the UAV 100 is able to collect additional objects without having to make a return flight.

Figure 9:
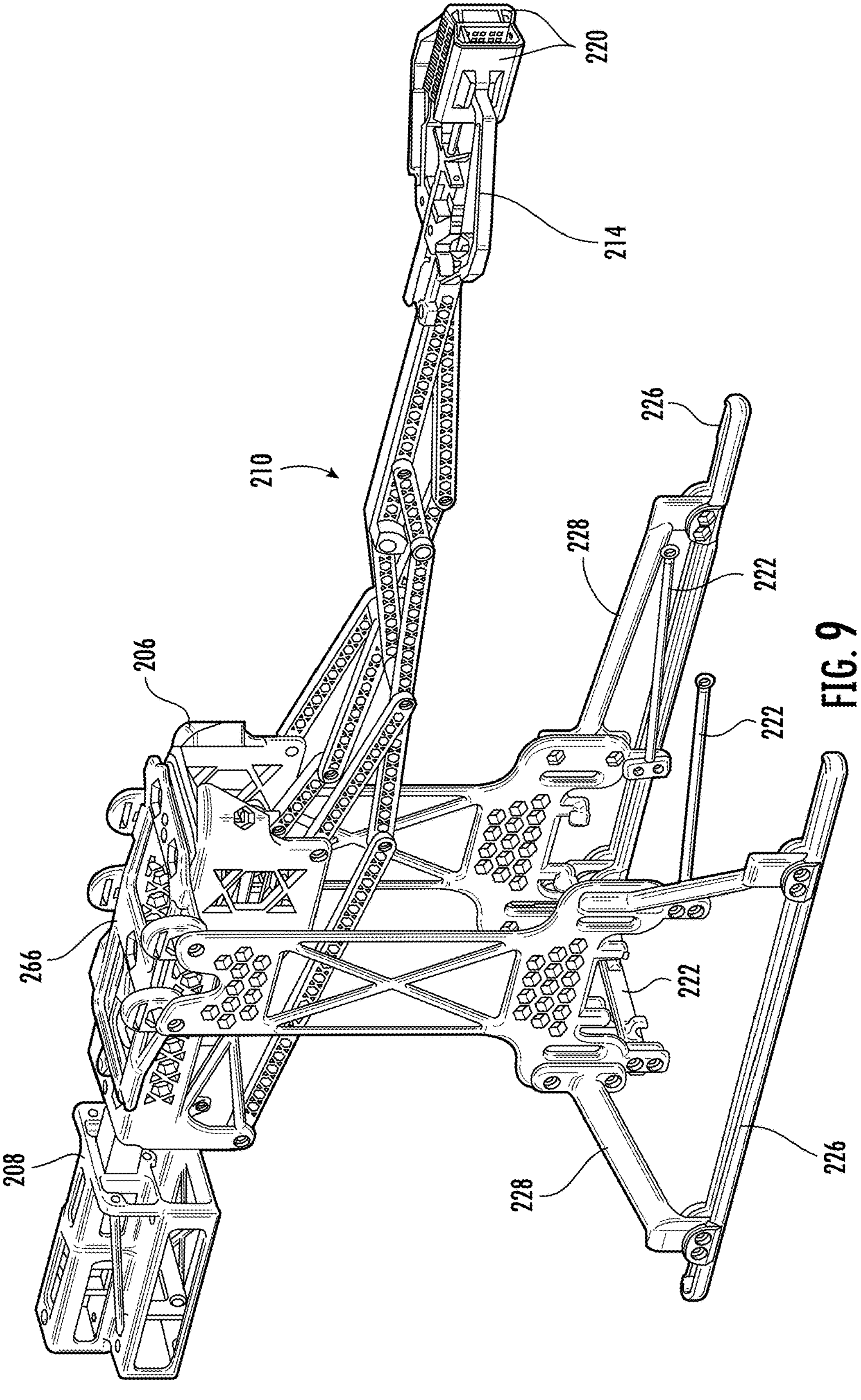
FIG. 9 provides a perspective view of the mechanism of FIG. 1 with the robotic arm in an extended position.
Figure 10:
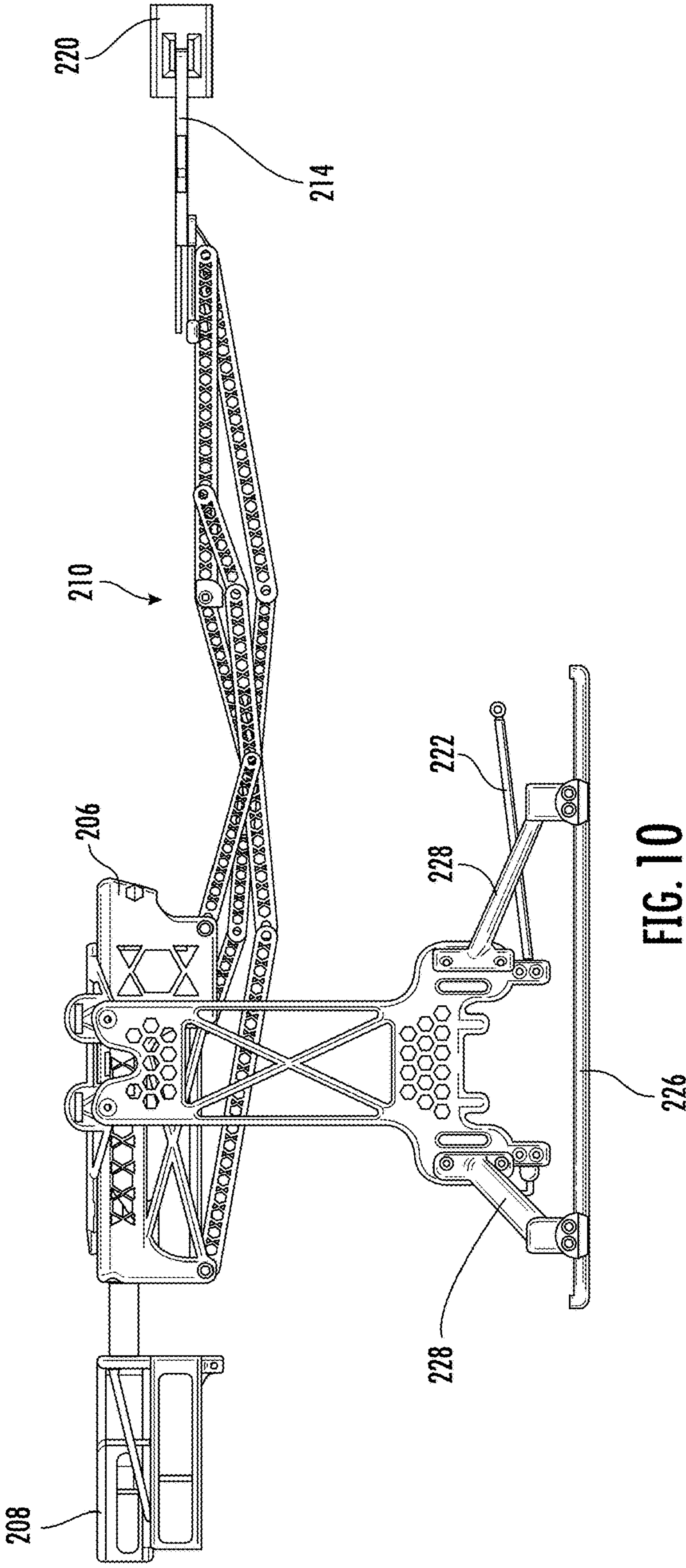
FIG. 10 provides a side view of the mechanism of FIG. 1 with the robotic arm in the extended position.

FIGS. 5-10 provide various views of the robotic arm 210 and illustrate an exemplary transition or sequence of motion for the folding robotic arm 210 from a retracted, folded position (FIGS. 5 and 6), through an intermediate position (FIGS. 7 and 8) to an extended, unfolded, position (FIGS. 9 and 10). The robotic arm 210 may include a plurality of links 212 which are connected at a plurality of joints 213. Each joint 213 may be a movable joint, such as a revolute joint. The robotic arm 210 may thus define a linkage, such as a Kempe kite inversor or other suitable linkage. For example, the linkage may be configured to fold and unfold, e.g., as the robotic arm 210 extends and retracts, such that the distal end 216 of the robotic arm 210 travels along a single straight line, e.g., generally along the transverse direction towards the front side 207 (FIG. 5) of the mechanism 200. Also as may be seen in FIGS. 5-10, the counterweight housing 208 may move in a direction generally opposite the direction of the arm 210 when the arm 210 extends and retracts. For example, when the arm 210 moves forward (towards the front side 207 of the mechanism 200) to or towards the extended position, the counterweight housing 208 may move rearward (towards the rear side 205 of the mechanism 200), e.g., away from the robotic arm housing 206. Accordingly, shifting of the center of gravity of the mechanism 200 while extending and retracting the arm 210 may be reduced or eliminated by moving the counterweight housing 208 in the generally opposite direction from the direction of movement of the folding robotic arm 210.

Figure 6:
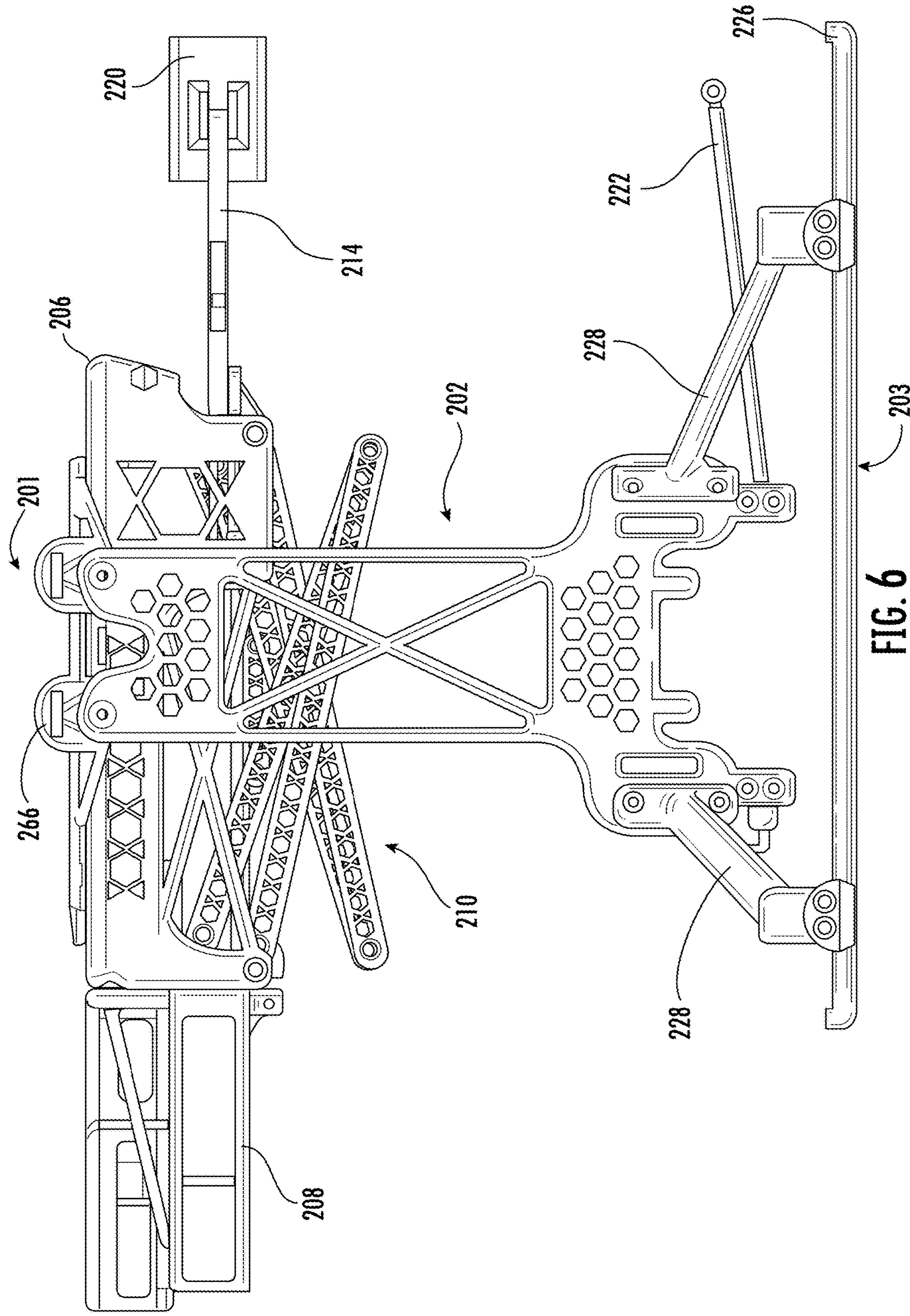
FIG. 6 provides another side view of the mechanism of FIG. 1 with the robotic arm in a retracted position.
Figure 7:
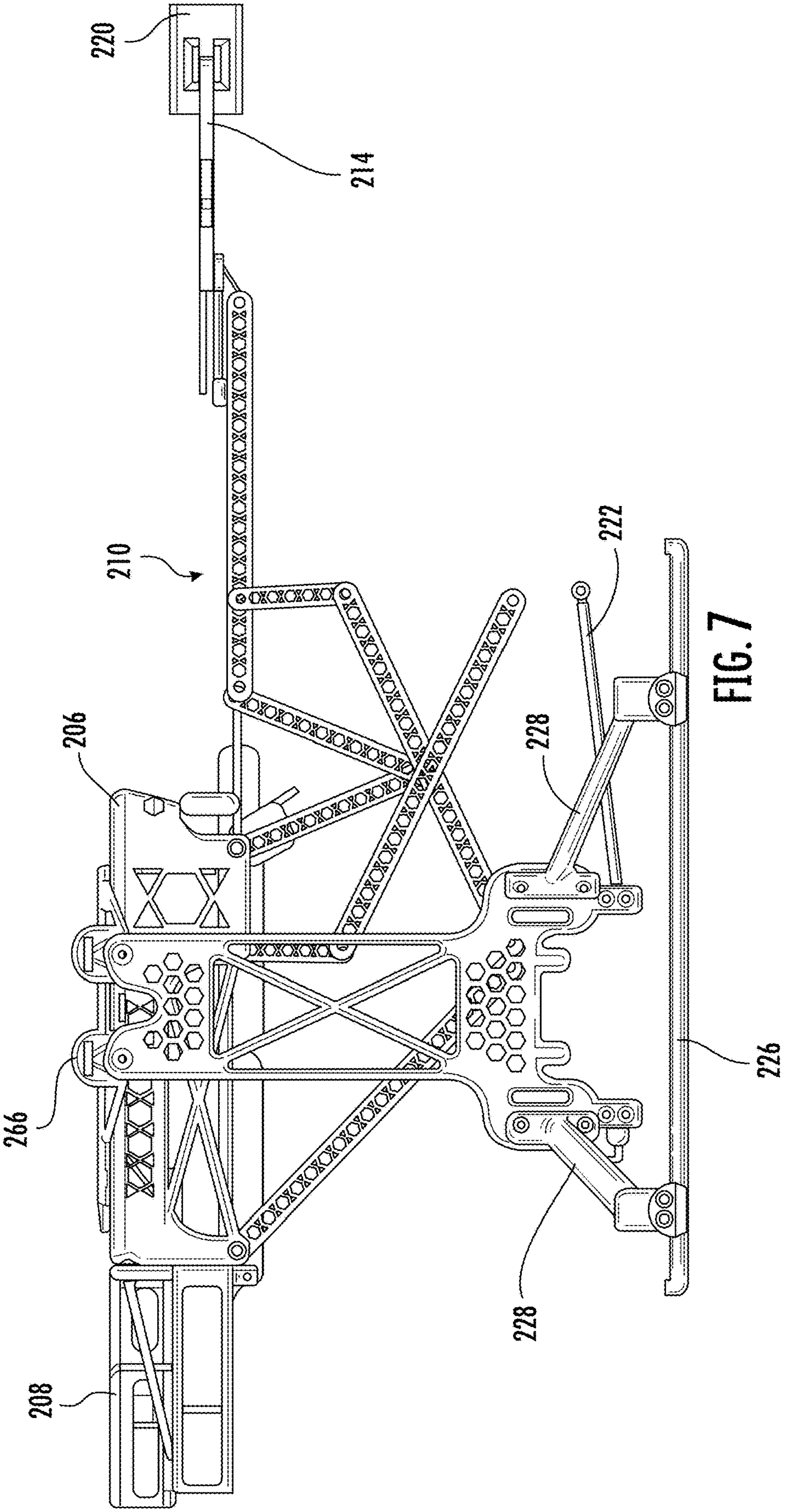
FIG. 7 provides a side view of the mechanism of FIG. 1 with the robotic arm in an intermediate position.
Figure 8:
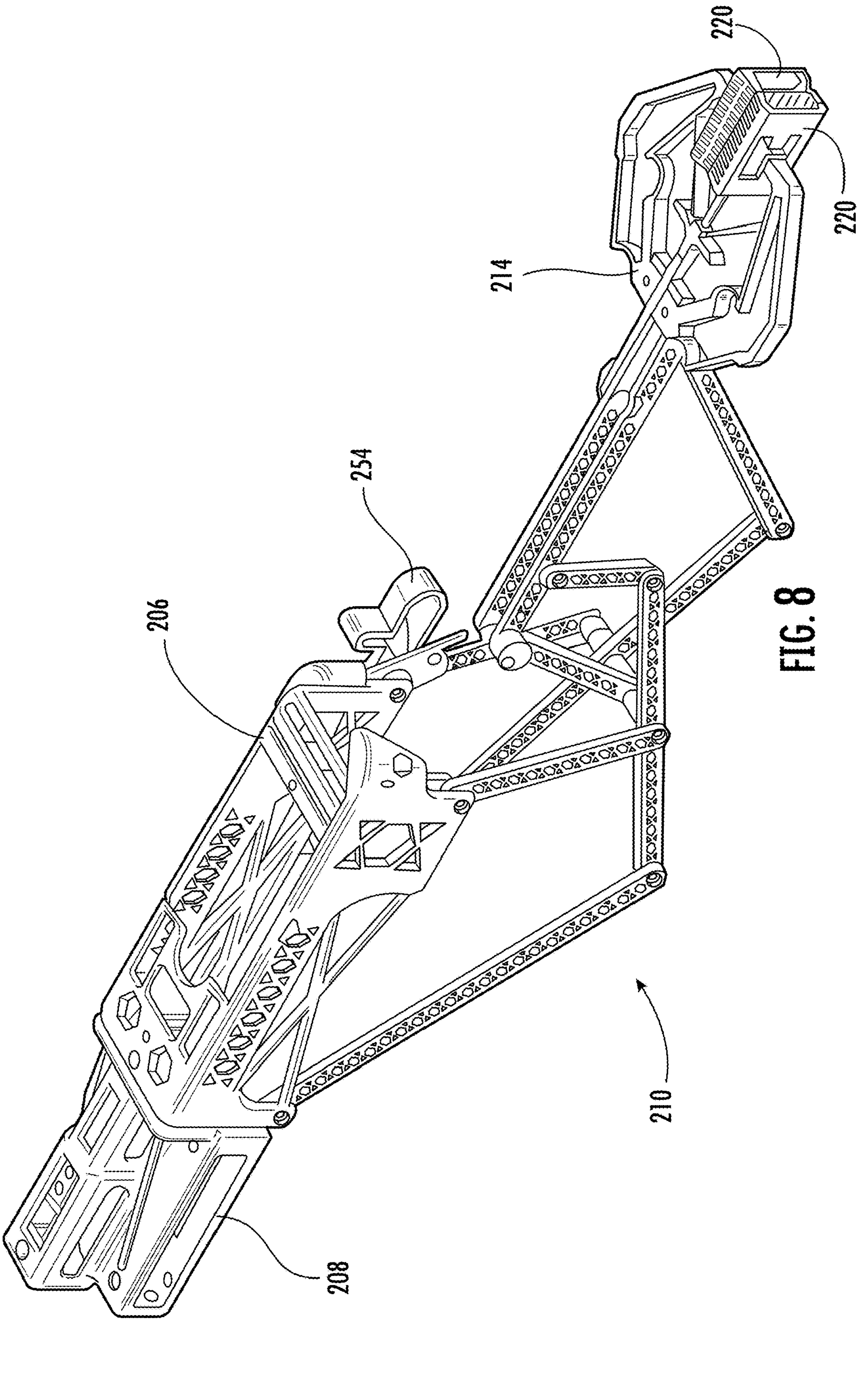
FIG. 8 provides a perspective view of a portion of a mechanism for a UAV including a counterweight housing, a robotic arm housing, a robotic arm in an intermediate position, and an end effector on a distal end of the robotic arm.

The mechanism 200 may include an actuator 250 (FIG. 4), and the actuator 250 may be configured to move the folding robotic arm 210 between the retracted position, e.g., FIGS. 5 and 6, and the extended position, e.g., FIGS. 9 and 10. The actuator 250 may be coupled to the folding robotic arm 210 via an actuation mechanism 252 (FIGS. 18-21) to move the folding robotic arm 210 between the retracted position and the extended position. For example, the actuator 250 may be or include a motor, such as a DC motor, e.g., a brushless DC motor, a stepper motor, or a servo motor. Any suitable motor may be provided, such as a motor which has a high holding torque to overcome the weight of the folding robotic arm 210 and an external object, such as a sample acquired using the folding robotic arm 210. Preferably, the motor may have a high torque and low speed, or may provide precision control of the position of the folding robotic arm 210. The actuation mechanism 252, which will be described further below, may include a Scotch yoke 254 to convert rotational movement of the motor into linear translational movement.

Figure 11:
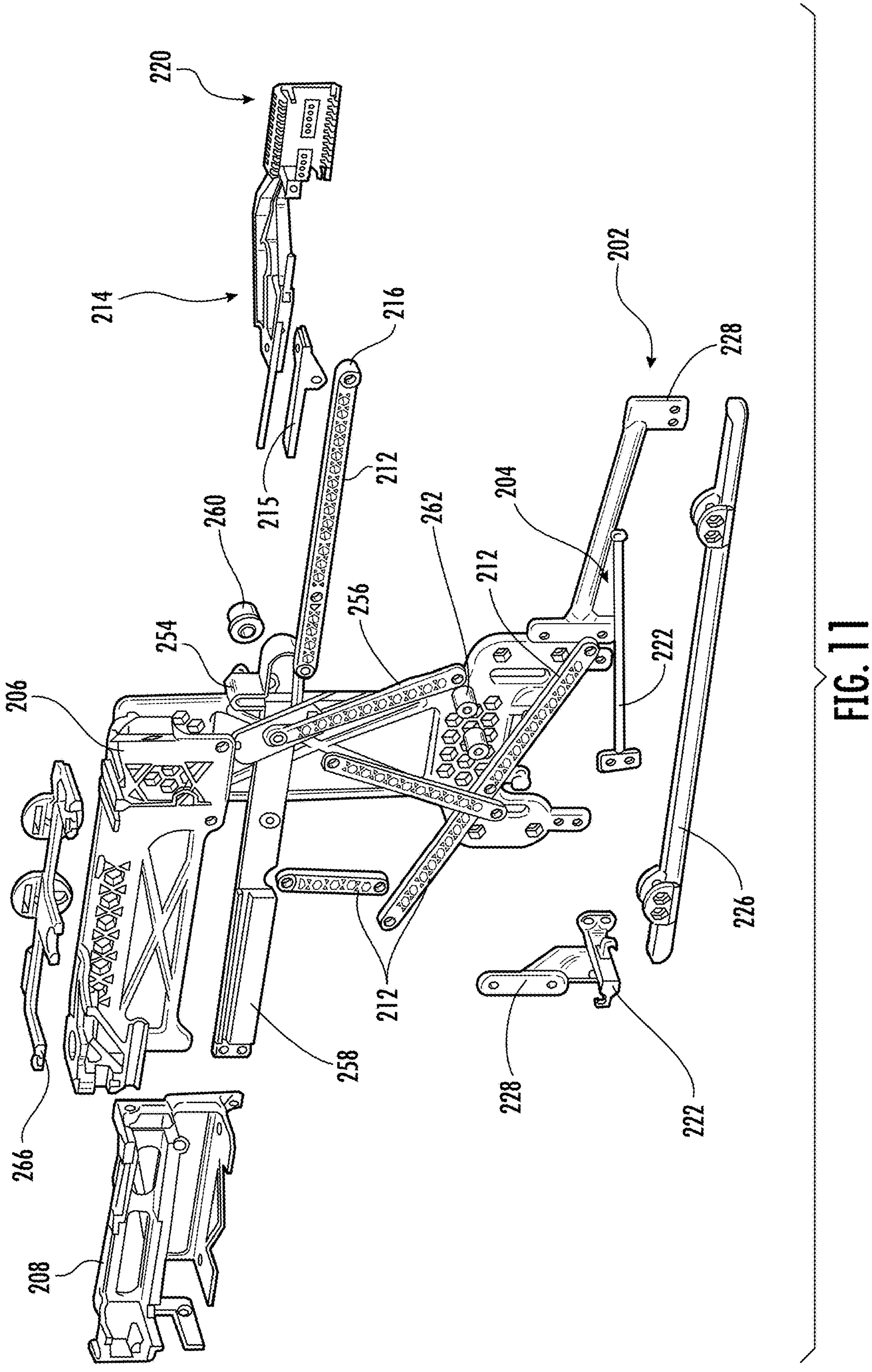
FIG. 11 provides a sectioned, exploded view of the mechanism of FIG. 1.

FIG. 11 provides a sectioned, exploded view of an exemplary embodiment of the mechanism 200. As may be seen, e.g., in FIG. 11, the landing gear 202 may include skids 226 which are mounted, e.g., coupled and/or fastened, to legs 228 of the landing gear 202. The end effector 214 (e.g., compliant gripper in the illustrated exemplary embodiment of FIG. 11, which may also be any suitable gripper or other end effector in various embodiments of the present disclosure) may be coupled to the distal end 216 of the folding robotic arm 210 by a bracket 215. The actuation mechanism 252 may include a scotch yoke 254, an actuator link 256, a guide rail 258, a bearing 260 engaged within a first loop of the scotch yoke 254 and a pin 261 (sec, e.g., FIGS. 19-21) engaged within a second loop of the scotch yoke 254. Spacers 262 may be provided between links 212 of the folding robotic arm 210, and the folding robotic arm 210 may further include mechanical stops 264. A bracket 266 may be positioned at the top of the landing gear 202, e.g., for mounting connectors, such as the illustrated straps (e.g., as may be seen in FIG. 4), which may be used to connect the drone 100 to the mechanism 200.

Figure 12:
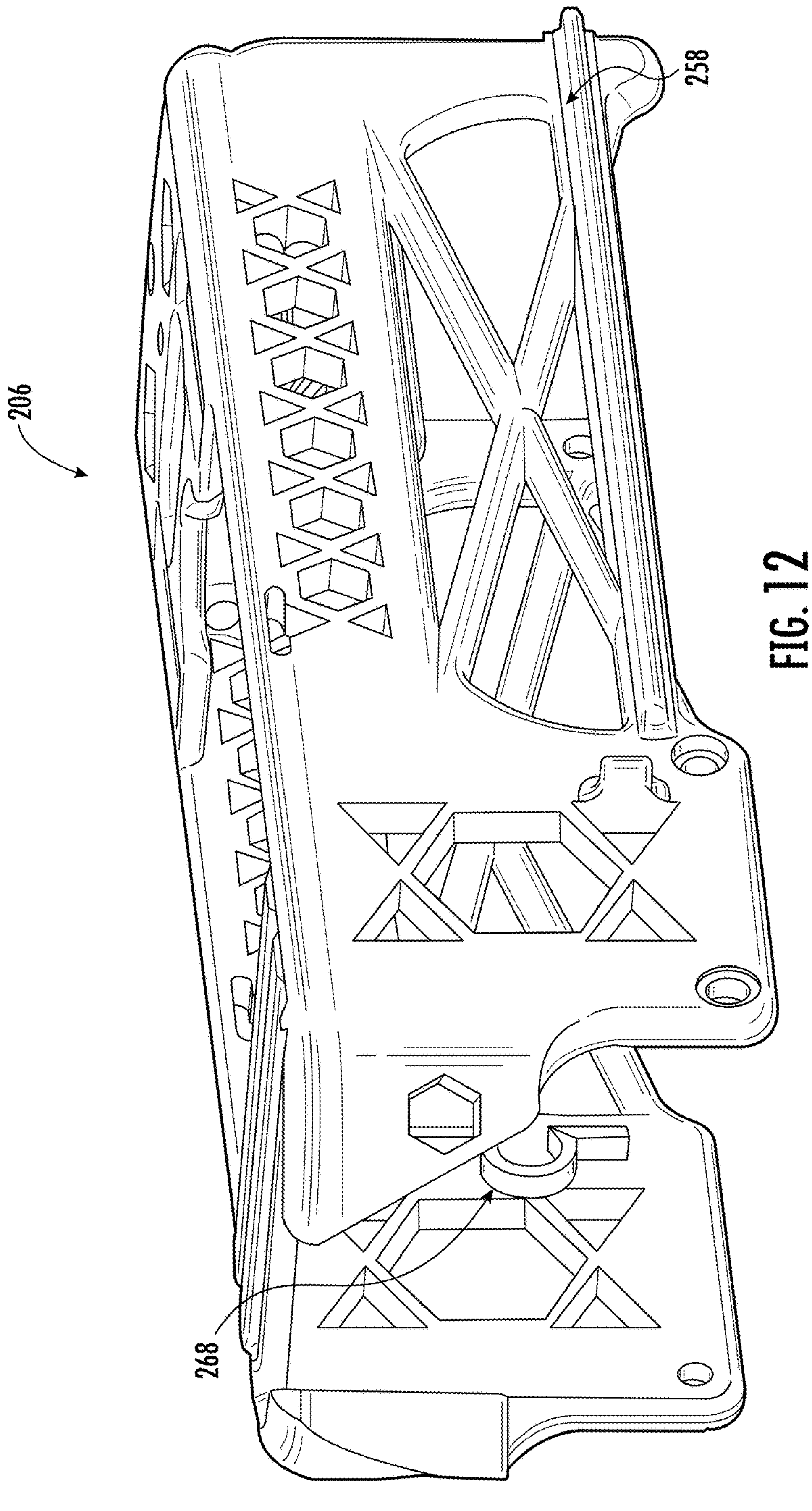
FIG. 12 provides a perspective view of the robotic arm housing of the mechanism of FIG. 11.
Figure 13:
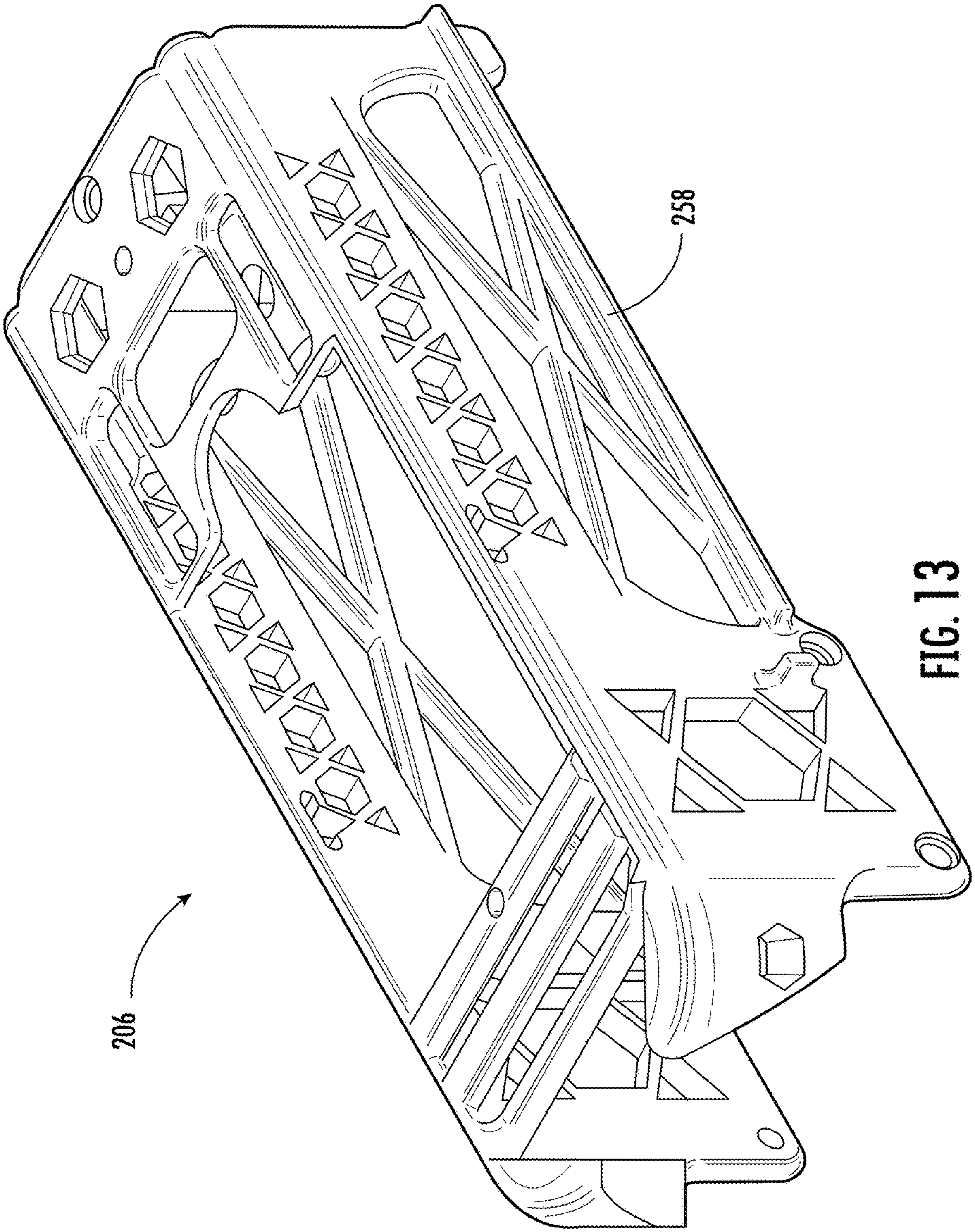
FIG. 13 provides another perspective view of the robotic arm housing of the mechanism of FIG. 11.

Additional perspective views of the robotic arm housing 206 in isolation from other components of the mechanism 200 are provided in FIGS. 12 and 13. As may be seen, e.g., in FIG. 12, the robotic arm housing 206 may include a gripper reset mechanism 268, such as a hooked projection which extends downward from a top internal surface of the robotic arm housing 206. The gripper reset mechanism 268 may be provided in embodiments where the end effector 214 is a compliant gripper (e.g., as illustrated in FIGS. 2-11 and 23-25, and described further below in reference to FIGS. 23-25), and the gripper reset mechanism 268 may be positioned and configured to contact the compliant gripper when the compliant gripper is mounted to the distal end 216 of the arm 210 and the arm 210 returns to the retracted position from the extended position (or a partially extended position). For example, the gripper reset mechanism 268 may be positioned and configured to contact the compliant gripper as the compliant gripper travels back or rearward, e.g., towards the rear side 205 of the mechanism 200, into the robotic arm housing 206. Such contact of the compliant gripper by the gripper reset mechanism 268 may thus reset the compliant gripper to the open position as the arm 210 retracts.

Figure 14:
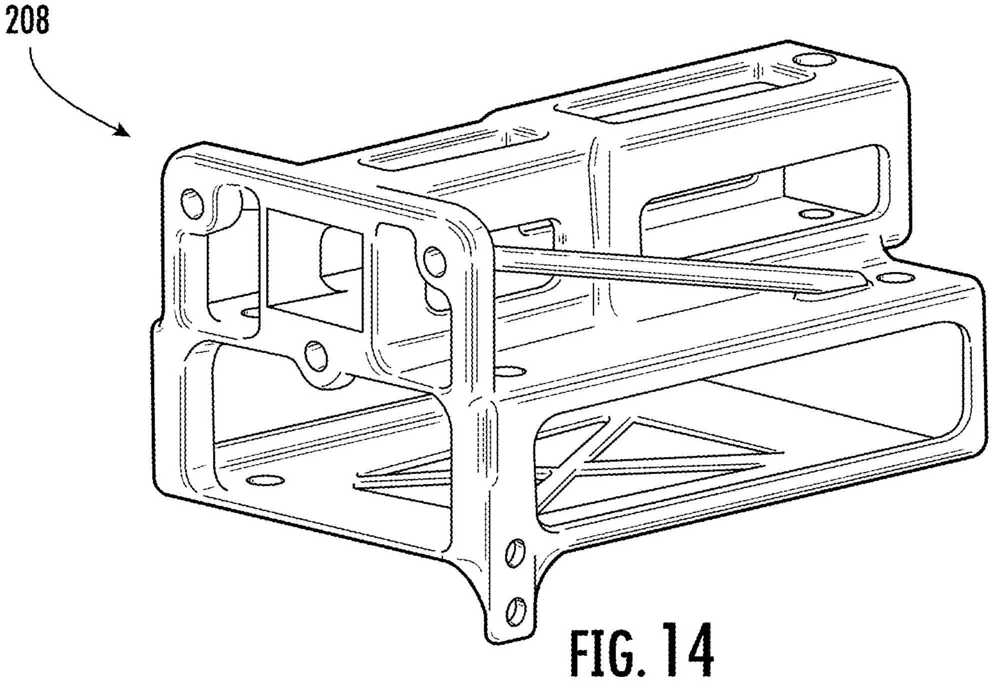
FIG. 14 provides a perspective view of a counterweight housing of the mechanism of FIG. 11.
Figure 15:
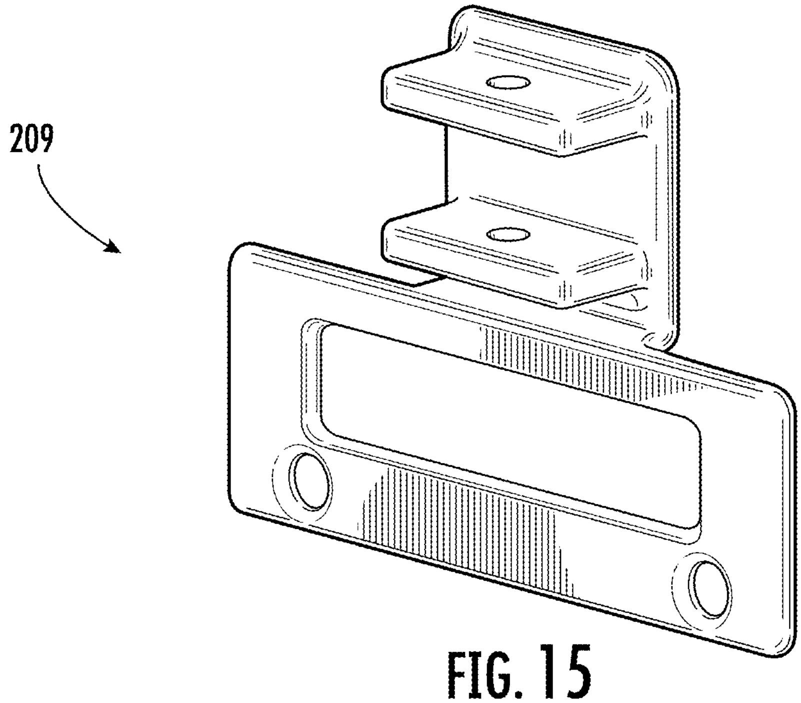
FIG. 15 provides a perspective view of a back cover for the counterweight housing of FIG. 14.

FIG. 14 provides a perspective view of the counterweight housing 208 in isolation from other components of the mechanism 200, and FIG. 15 provides a perspective view of a back cover 209 thereof. As mentioned above, the weight of the counterweight housing 208 itself, including the back cover 209 mounted thereto, may be used to offset shifting the center of gravity of the mechanism 200 when the folding robotic arm 210 extends and retracts. In addition, one or more other components of the mechanism 200 may be mounted within the counterweight housing 208 and enclosed by the back cover 209 of the counterweight housing 208, whereby the weight of such component(s) further adds to the counterbalancing of the arm 210 as the arm 210 extends and retracts. For example, the actuator 250, e.g., motor, may be mounted within the counterweight housing 208 (e.g., as may be seen in FIG. 4) such that the actuator 250 moves with the counterweight housing 208.

Figure 16:
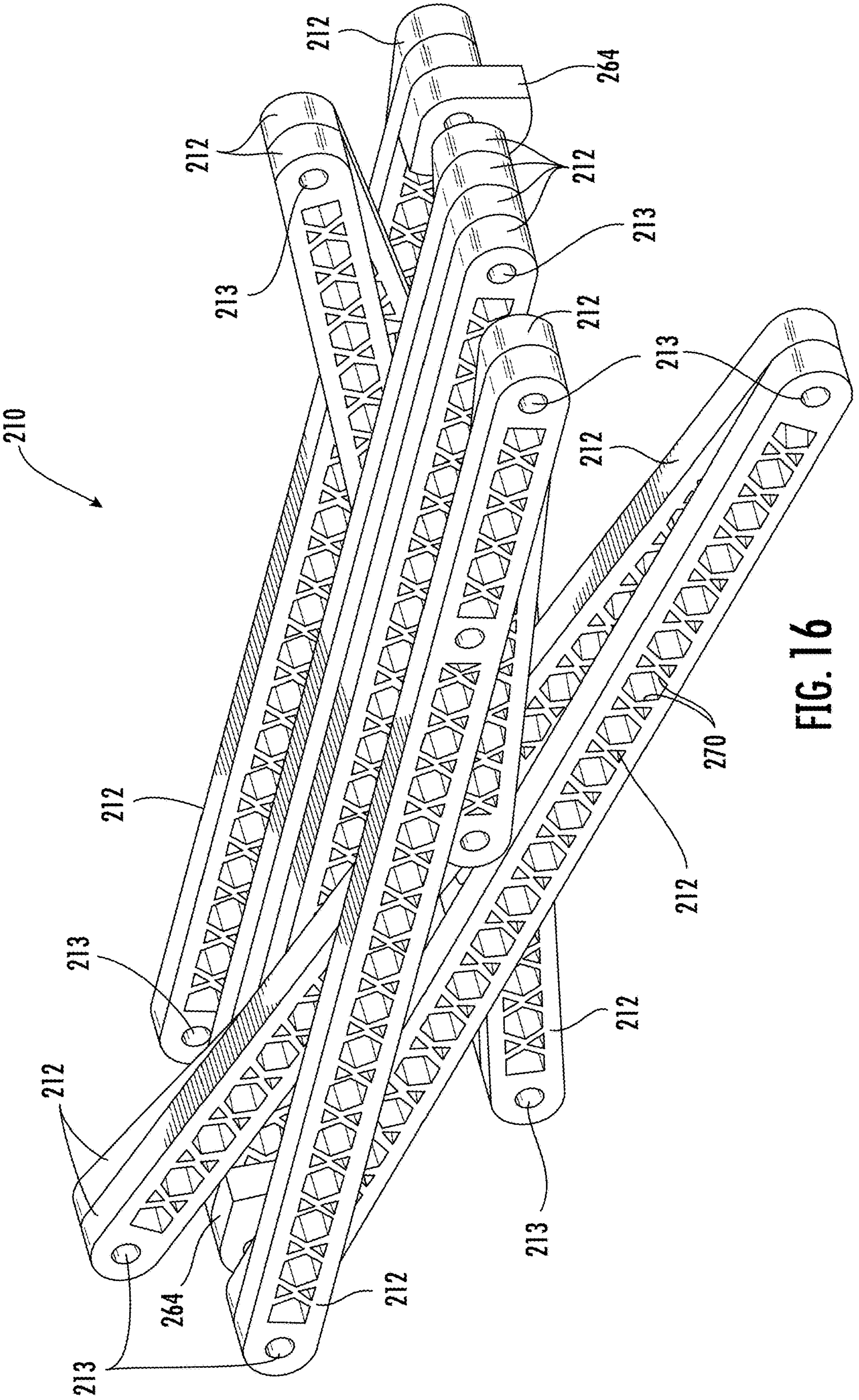
FIG. 16 provides a perspective view of an exemplary robotic arm which may be incorporated into a mechanism according to one or more embodiments of the present disclosure, such as the mechanism of FIG. 1, with the arm in a retracted position.
Figure 17:
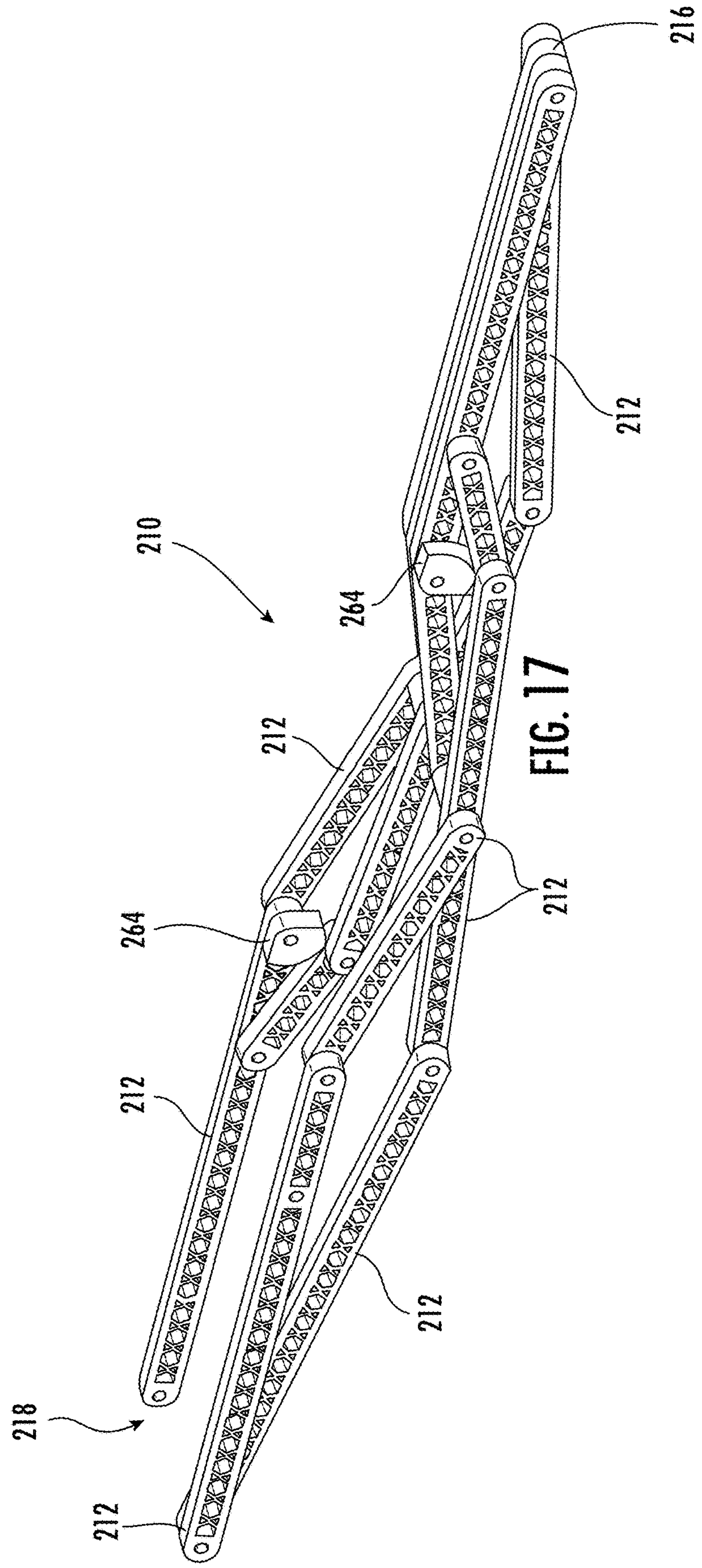
FIG. 17 provides a perspective view of the exemplary robotic arm of FIG. 16 in an extended position.

Additional perspective views of the robotic arm 210 in isolation from other components of the mechanism 200 are provided in FIGS. 16 and 17. In particular, the robotic arm 210 is illustrated in the folded, retracted position in FIG. 16 and in the unfolded, extended position in FIG. 17. Mechanical stops 264 may be provided to reduce or prevent overextension of the robotic arm 210. For example, one or more mechanical stops 264 may be mounted to one or more respective links 212 in the linkage which comprises the robotic arm 210, and the mechanical stop 264 (or each mechanical stop 264 when more than one is provided) may be positioned and configured to abut a neighboring link 212 when in the extended position, thereby obstructing further extension of the robotic arm 210.

As may be seen, e.g., in FIGS. 16 and 17, each link 212 in the linkage may include an internal open web, e.g., defined by a plurality of struts 270 (FIG. 16) which extend within the link 212 and which define voids or apertures therebetween. For example, the struts 270 may be positioned and oriented so as to define a honeycomb pattern of hexagonal voids within the internal open web of each link 212. The internal open web in each link 212 may reduce the weight thereof, and consequently of the robotic arm 210 overall, while retaining structural strength of the links 212, and the linkage collectively, to support the torque and other loads applied to the robotic arm 210 during extension, retraction, and retrieval of samples (and/or other manipulations of one or more objects 1000 by the end effector 214).

Figure 18:
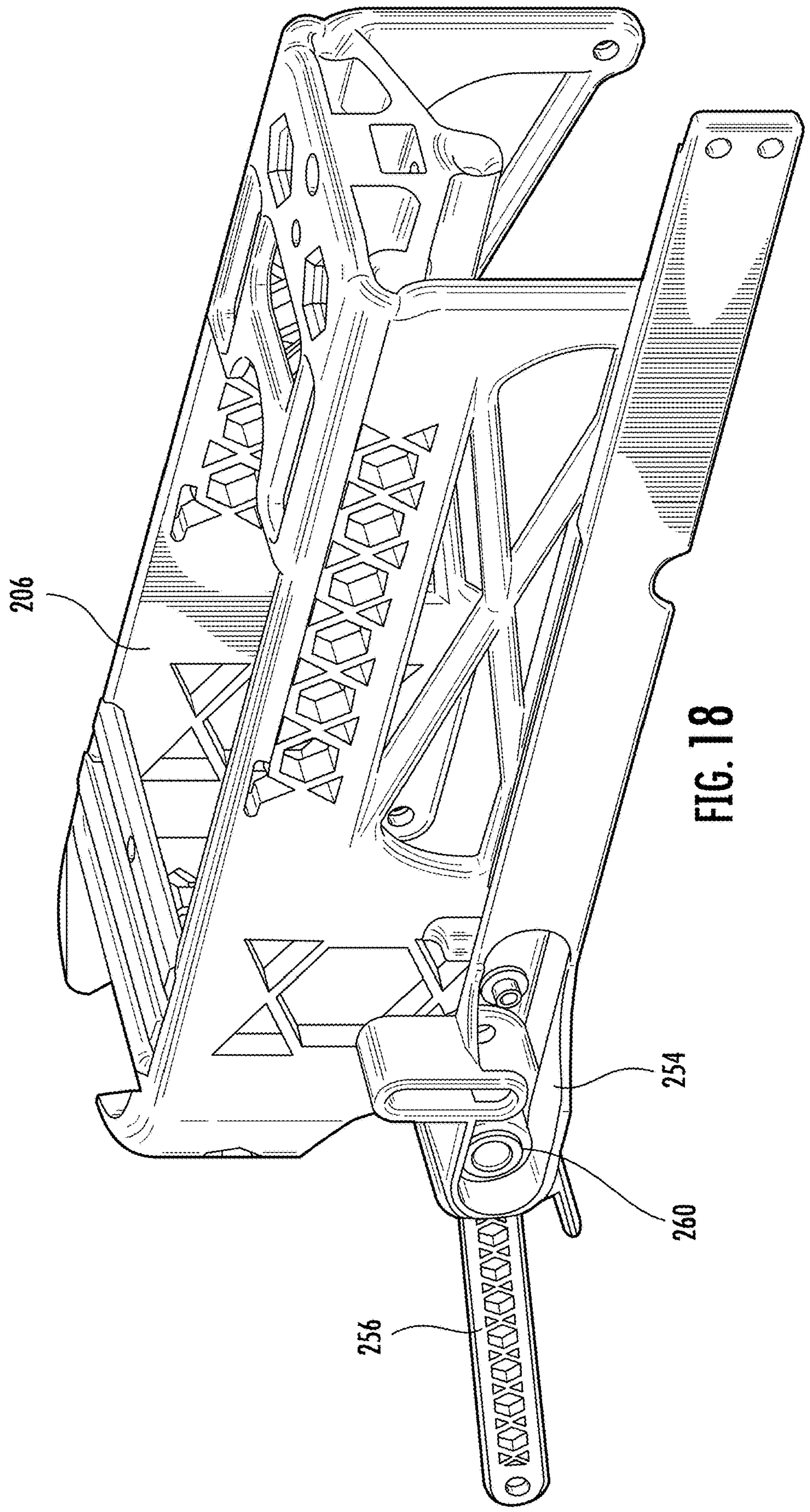
FIG. 18 provides a perspective view of the robotic arm housing of FIG. 12 with an actuation mechanism mounted thereto.
Figure 19:
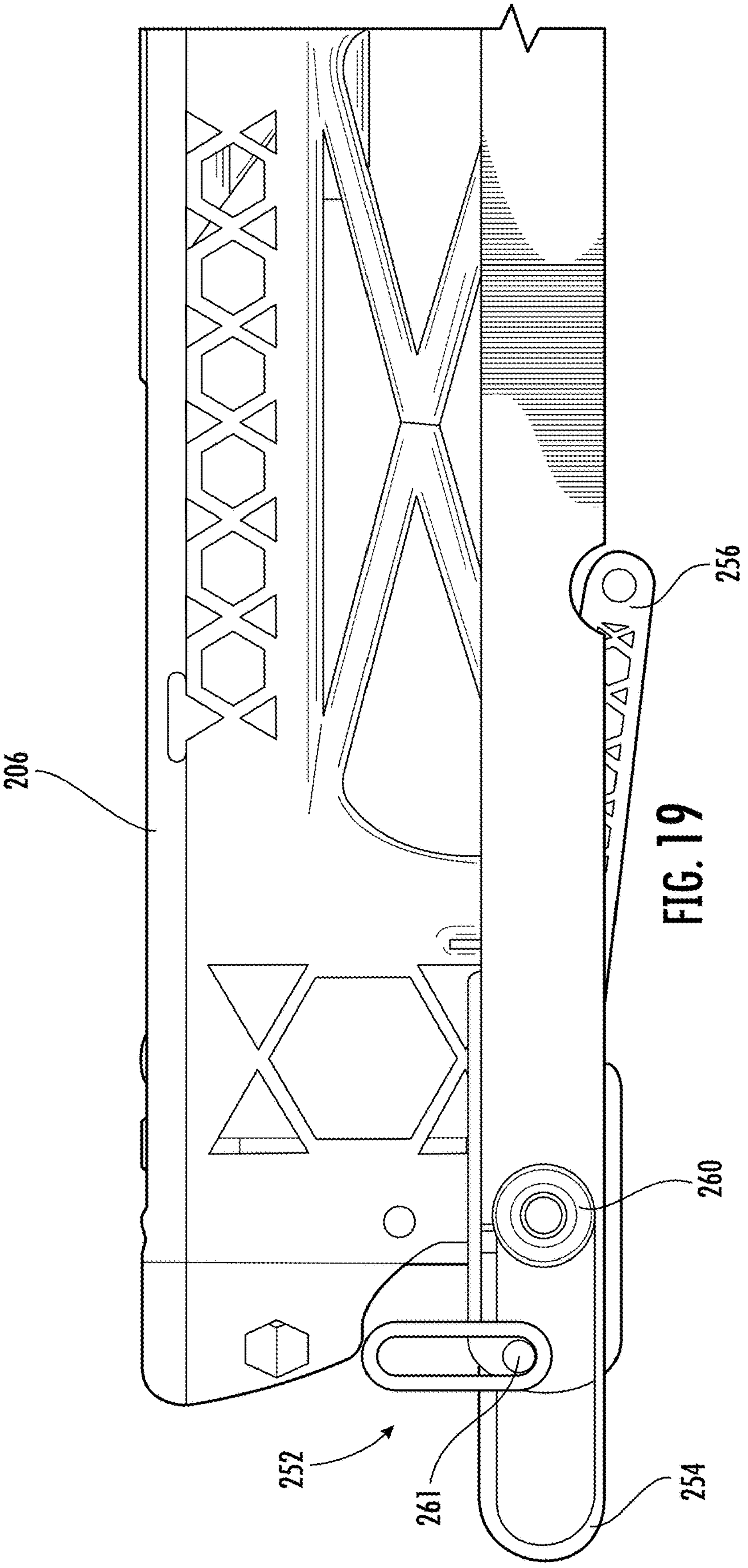
FIG. 19 provides a side view of a portion of the robotic arm housing and actuation mechanism of FIG. 18 in a retracted position.
Figure 20:
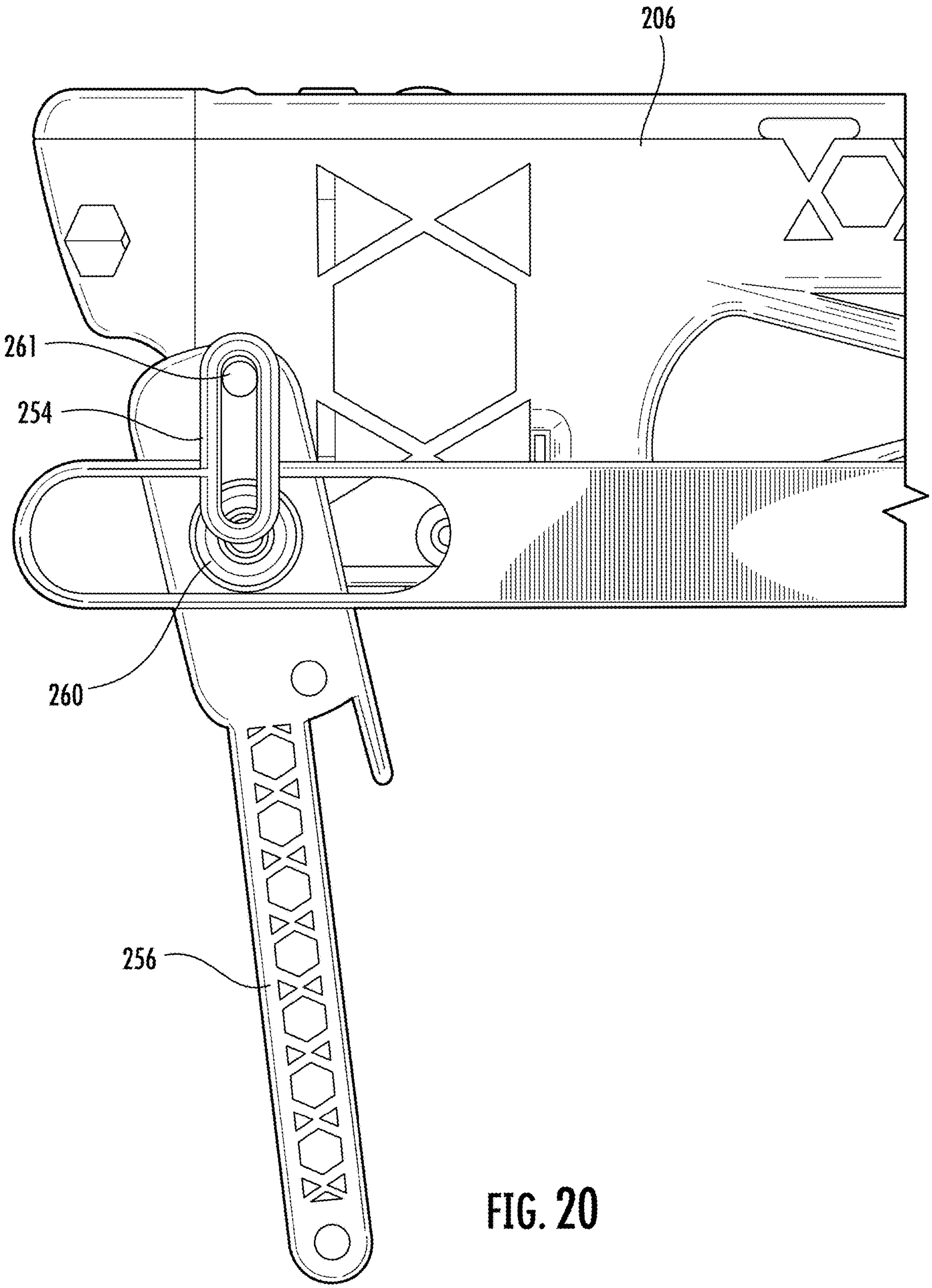
FIG. 20 provides a side view of a portion of the robotic arm housing and actuation mechanism of FIG. 18 in an intermediate position.
Figure 21:
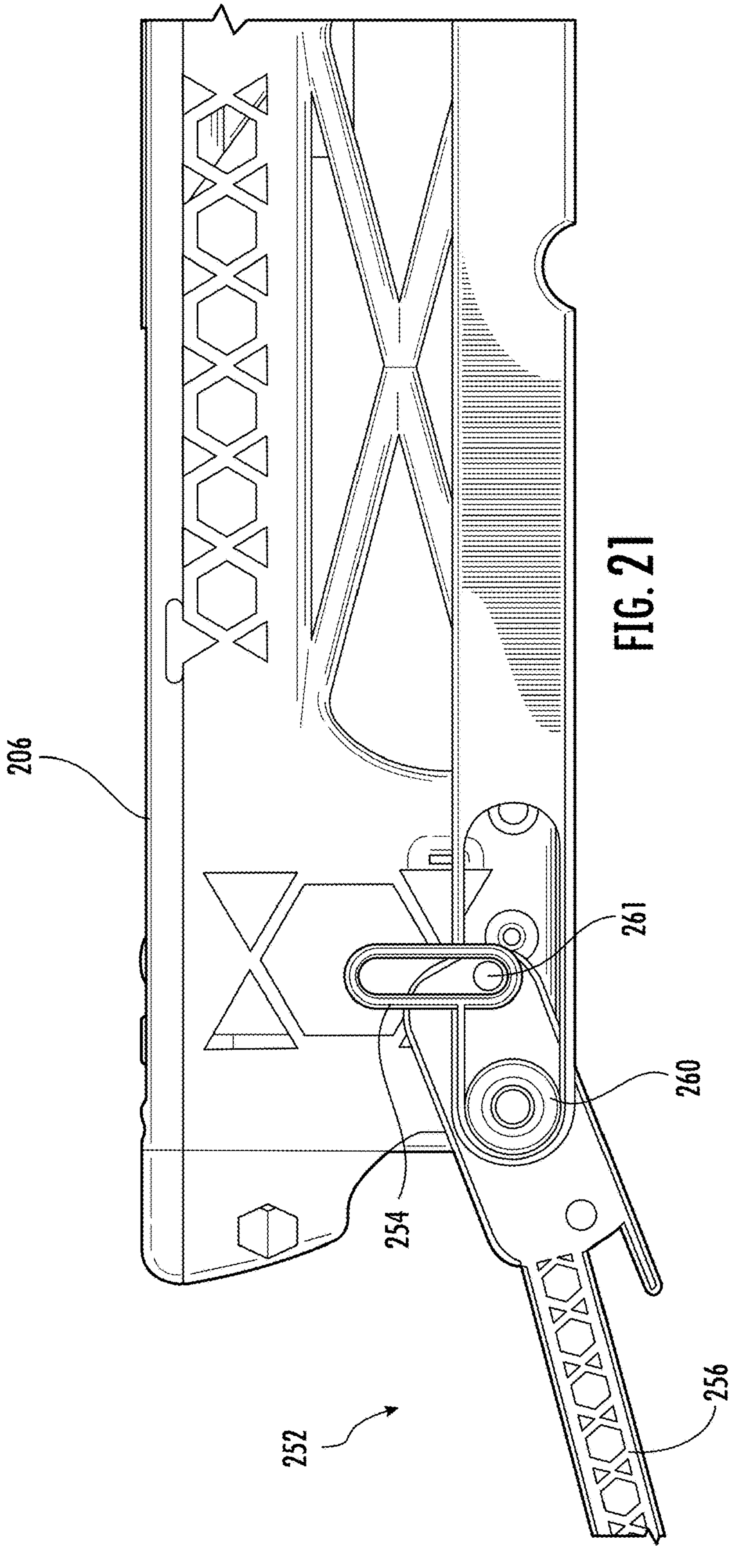
FIG. 21 provides a side view of a portion of the robotic arm housing and actuation mechanism of FIG. 18 in an extended position.

Additional details of the actuation mechanism 252 may be seen in FIGS. 18-21. FIG. 18 provides a perspective view of a portion of the mechanism 252, with the actuation mechanism 252, e.g., actuation link 256 thereof, in an extended position. In FIGS. 18-21, the front side 207 of the mechanism 200 is oriented towards the left side of the page. Thus, it can be seen in FIG. 18 that the actuation link 256 extends forward of the robotic arm housing 206 in the extended position. As illustrated throughout the accompanying FIGS., the actuation link 256 may be coupled to one of the links 212 of the robotic arm 210 to transfer motion of the actuation link 256 to the robotic arm 210, whereby movement of the actuation link 256 by the actuator 250 is used to extend and retract the robotic arm 210. FIG. 19 provides a side view of the actuation mechanism 252 in the retracted position. As may be seen in FIG. 19, when in the retracted position, the bearing 260 is positioned at a back end of the first loop of the scotch yoke 254 and the pin 261 is positioned at a bottom end of the second loop of the scotch yoke 254. Turning now to FIG. 20, where the actuation mechanism 252 is illustrated in an intermediate position between the retracted position of FIG. 19 and the extended position of FIG. 21, it can be seen that the actuation link 256 is rotated downward and forward from the retracted position as the robotic arm 210 is thereby urged towards the extended position. In the extended position, e.g., as illustrated in FIG. 21, the bearing 260 is positioned at a front end of the first loop of the scotch yoke 254 and the pin 261 is positioned at a bottom end of the second loop of the scotch yoke 254, with the pin 261 having reciprocated between the top end (e.g., as illustrated in FIG. 20) of the second loop and the bottom end of the second loop during movement of the folding robotic arm 210 between the retracted and extended positions.

Figure 22:
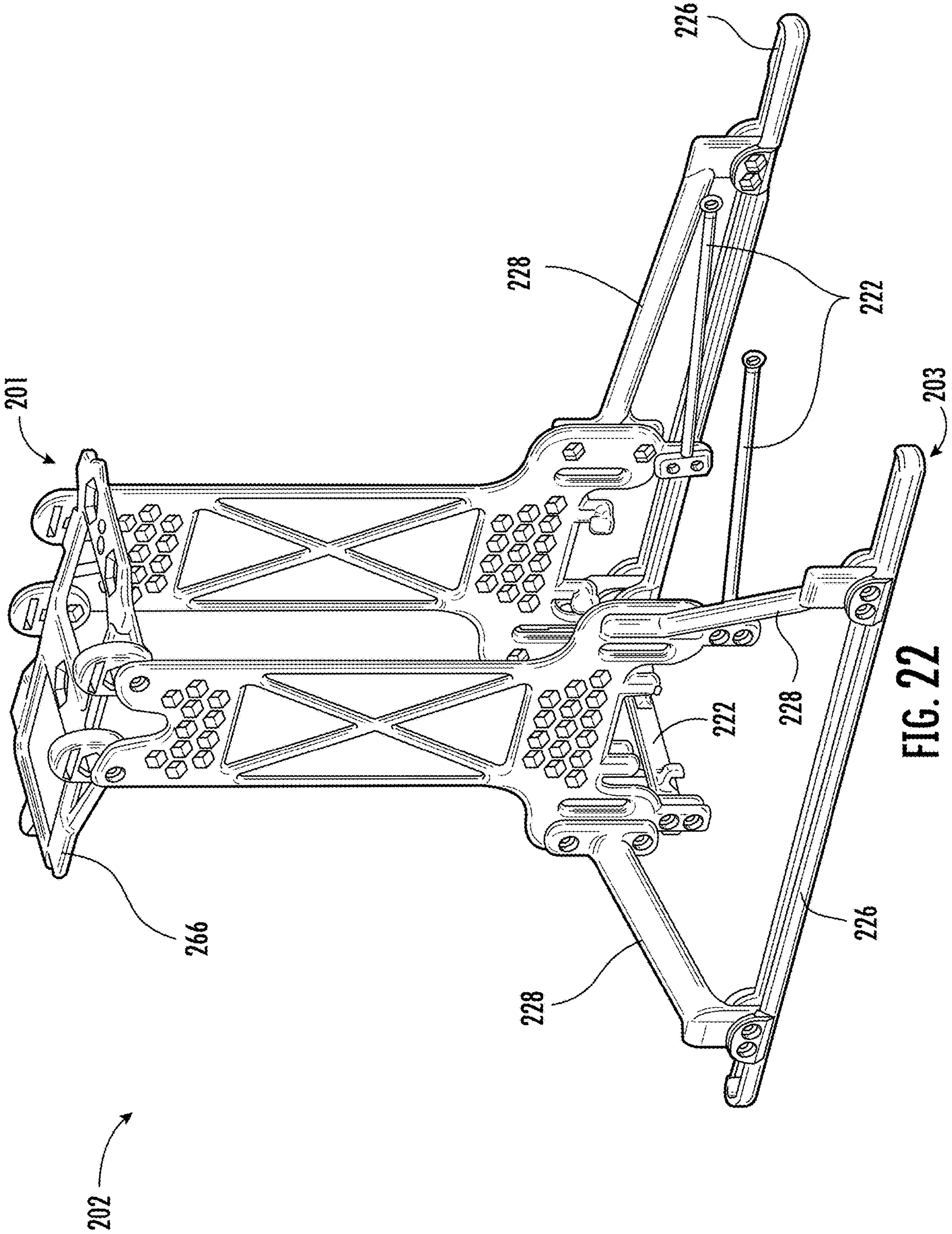
FIG. 22 provides a perspective view of an exemplary landing gear of a mechanism for a UAV, such as the mechanism of FIG. 1.

FIG. 22 provides a perspective view of the landing gear 202 in isolation. The landing gear 202 may define the total vertical extent of the mechanism 200, such as the landing gear 202 may extend between the pair of skids 226 at the bottom end 203 of the mechanism 200 and a connector, e.g., bracket 266, at the top end 201 of the mechanism 200. In other words, the skids 226 may be at the lowest extent of the mechanism 200 and thereby define the bottom end 203 of the mechanism, while the connector bracket 266 may be positioned at the uppermost extent of the mechanism 200 and thereby define the top side 201 of the mechanism 200. For example, the robotic arm housing 206 (see, e.g., FIGS. 4-6) may be installed underneath the connector bracket 266. The connector is configured to couple to the lower side of the body of the unmanned aerial vehicle.

Figure 23:
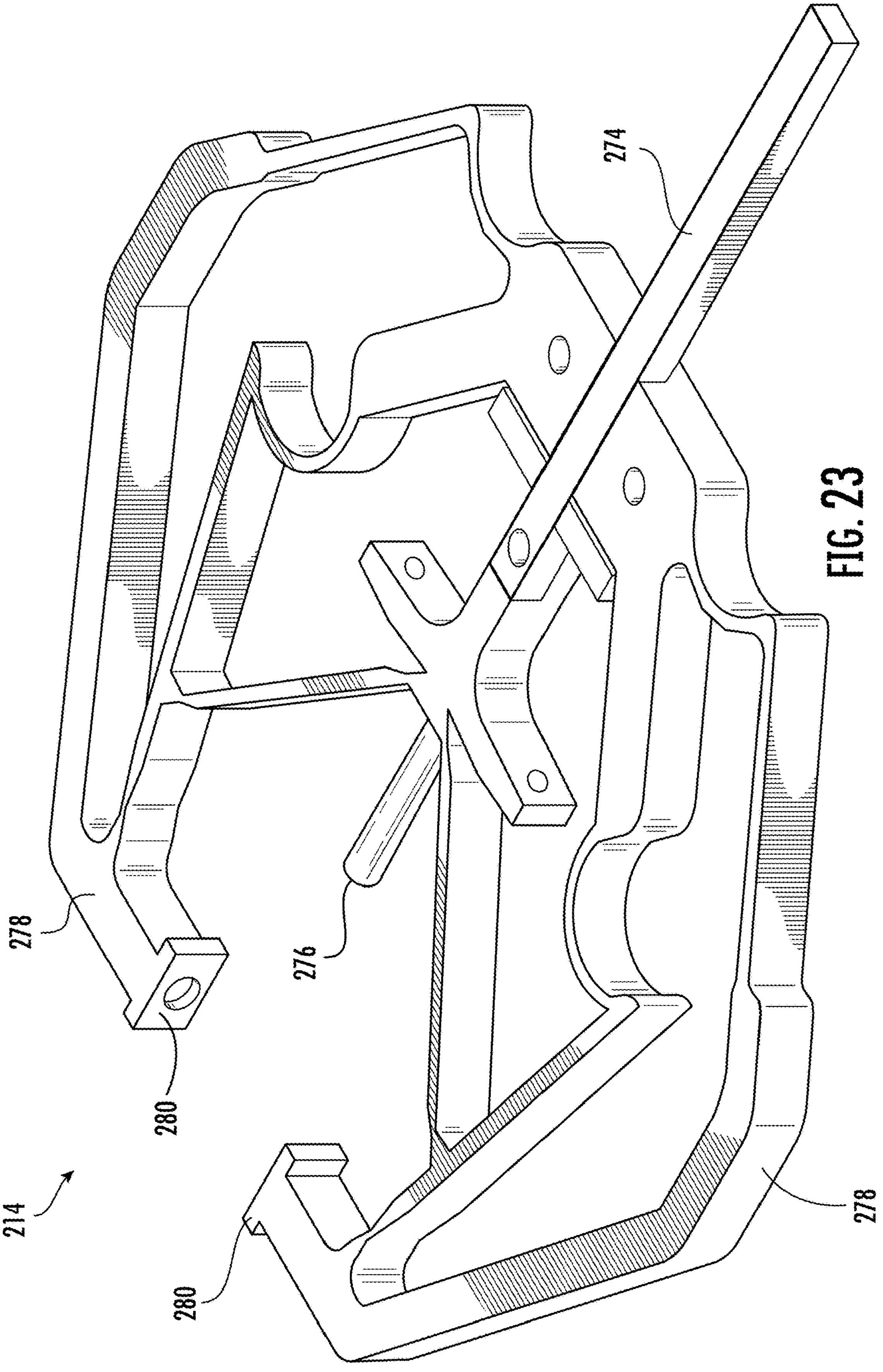
FIG. 23 provides a perspective view of an exemplary end effector for a mechanism according to one or more exemplary embodiments of the present disclosure.
Figure 24:
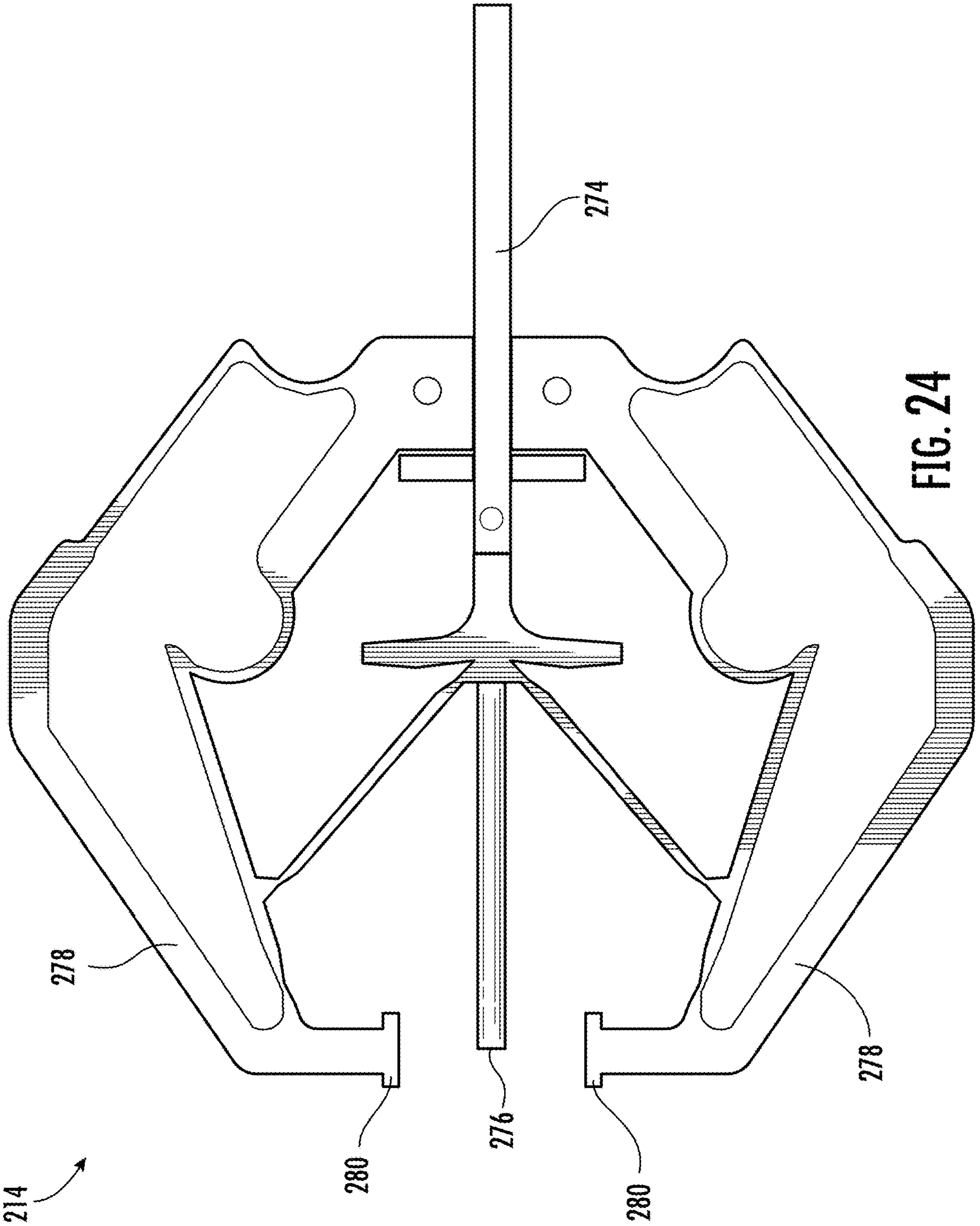
FIG. 24 provides a top view of the exemplary end effector of FIG. 23.
Figure 25:
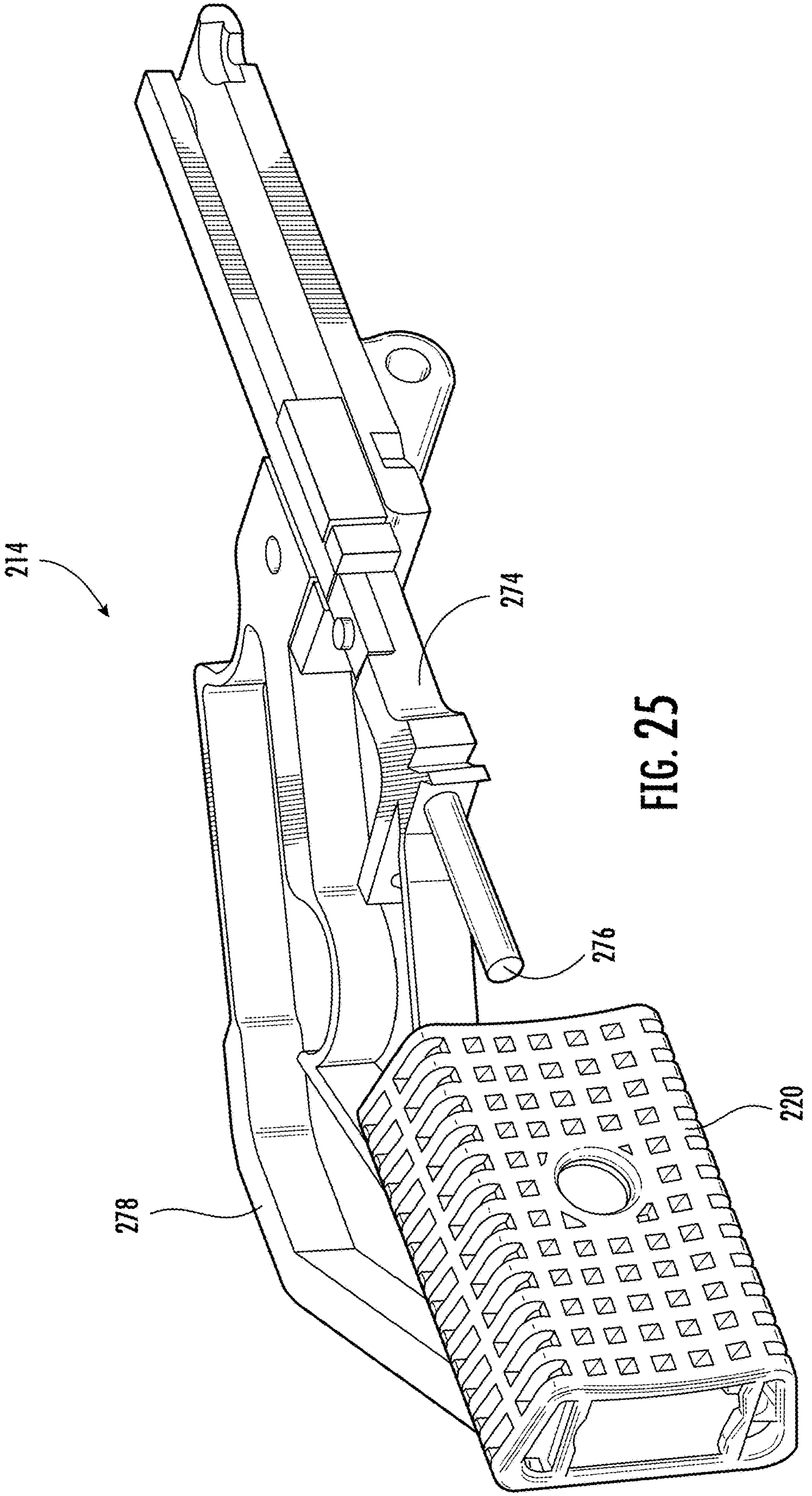
FIG. 25 provides a sectioned perspective view of the exemplary end effector of FIG. 23 with a compressible element coupled thereto.

An exemplary end effector 214, e.g., a compliant gripper, is illustrated in a perspective view in FIG. 23 and a top view in FIG. 24. In exemplary embodiments which include the compliant gripper 214, the gripper may be formed of a resilient flexible material to provide a spring force, e.g., the compliant gripper 214 may be biased to the closed position such that the compliant gripper 214 may snap closed, e.g., in a “mouse trap” manner. The compliant gripper 214 is illustrated in a closed position in FIGS. 23 and 24. The compliant gripper 214 may include two opposing claws 278 at opposite sides of the compliant gripper 214 which are positioned and oriented with tips 280 of each claw 278 facing each other. The compliant gripper 214 may also include a push rod 274 which is linked to the claws 278. When the push rod 274 is slid forward, the complaint gripper 214 may thereby be primed, e.g., in an open position with the claws 278, e.g., tips 280 thereof, spaced apart from each other and positioned and configured to move rapidly to the closed position due to spring force of the gripper material. For example, the compliant gripper 214 may include wings which extend from the push rod 274 to each claw 278 in an oblique direction. Pushing the push rod 274 forward (e.g., to the left on the page in FIGS. 23 and 24, such as towards the front side 207 of the mechanism 200 when the compliant gripper 214 is mounted to the arm 210) may, for example, translate the oblique wings forward and outward, thereby spreading the claws 278 apart to open the compliant gripper 214. When an object 1000 (sec, e.g., FIGS. 2 and 36-38) contacts the push rod 274, e.g., at a tip 276 of the push rod 274, e.g., as the arm 210 with the compliant gripper 214 mounted thereon moves towards the object 1000, the object 1000 may thusly urge the push rod 274 rearwards (e.g., towards rear side 205 of the mechanism 200) which also pulls the oblique wings together and rearward, thereby moving the claws 278 towards each other and to the closed position. For example, spring tension may be retained in the claws 278 and wings of the compliant gripper 214 when in the open position, such that a small force on the tip 276 of the push rod 274 is sufficient to trigger the compliant gripper 214 to close on the object 1000 when the object 1000 touches the tip 276 of the push rod 274.

Also as may be seen in FIGS. 23 and 24, the tips 280 of the claws 278 of the compliant gripper 214 may be enlarged and may have a rectangular prismatic shape. Accordingly, as may be seen for example in FIG. 25, compressible elements 220 may be mounted on each claw 278 at the tip 280 thereof, e.g., with the shape of the tip 280 providing increased contact area between the respective claw 278 and the compressible element 220 for more secure connection and retention of the compressible element 220 on the claw 278.

Figure 26:
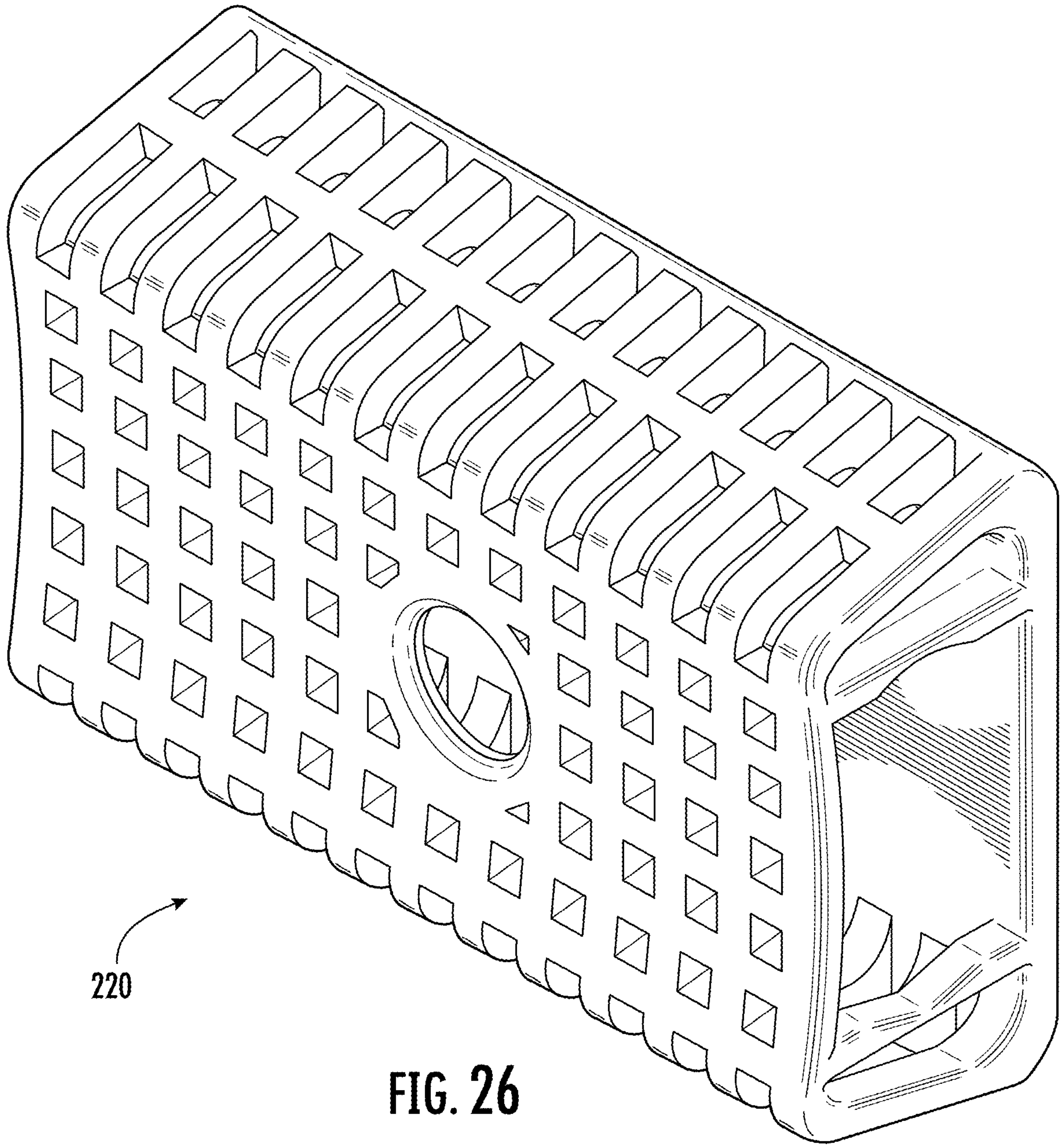
FIG. 26 provides a perspective view of the compressible element of FIG. 25.

Various possible shapes and configurations may be provided for the compressible elements 220. Such various compressible elements 220 may be provided on any suitable end effector 214 according to embodiments of the present disclosure. For example, one such compressible element 220 is illustrated in FIG. 26, and may be provided on the compliant gripper 214, e.g., of FIGS. 23 and 24, or on any other suitable end effector, e.g., gripper, in various embodiments of the present disclosure. Additional exemplary compressible elements 220 are also illustrated in FIGS. 34-38, which may be used with any suitable end effector 214, such as the compliant gripper, the shell gripper, or other similar grippers or other end effectors.

Figure 27:
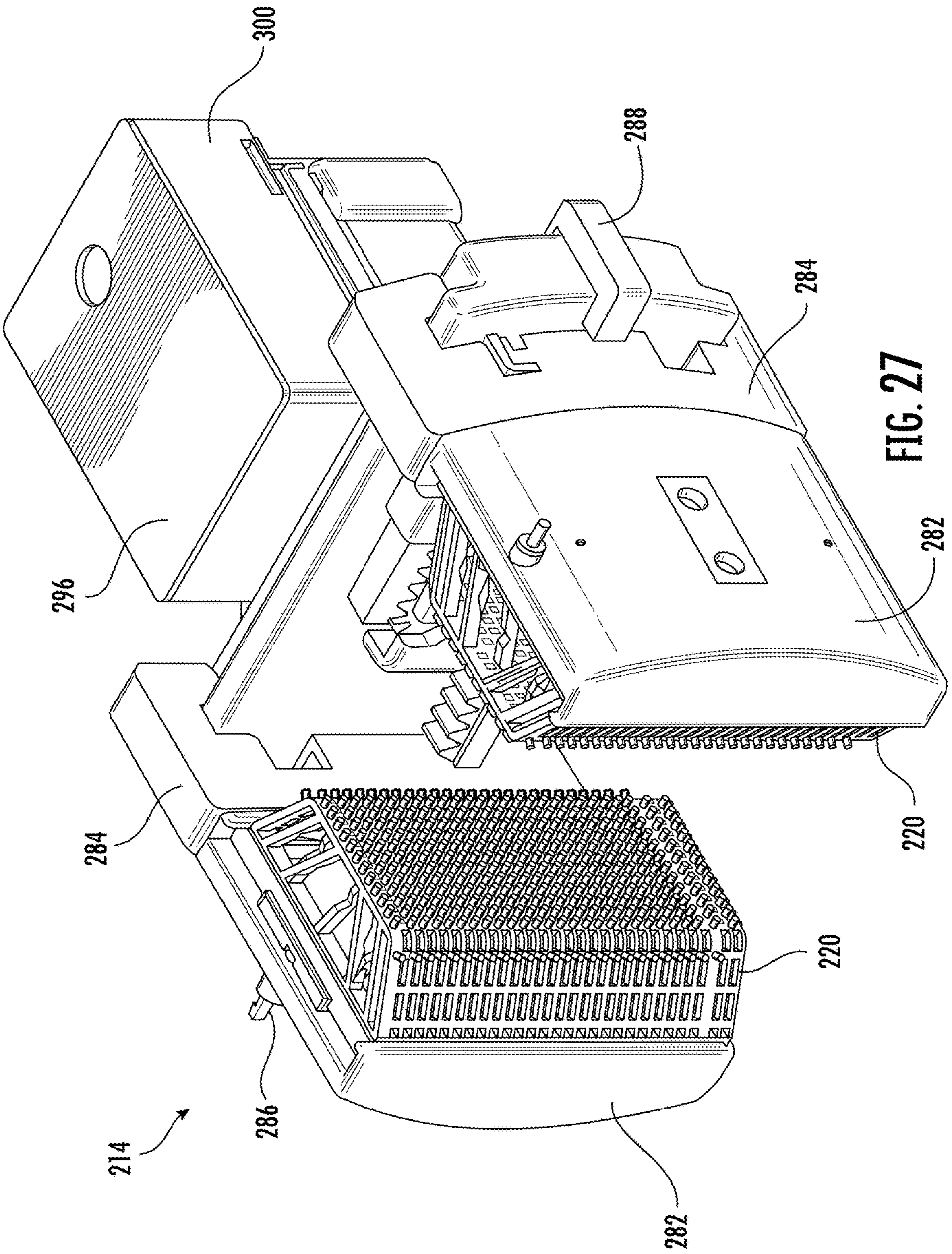
FIG. 27 provides a perspective view of an exemplary end effector for a mechanism according to one or more additional exemplary embodiments of the present disclosure.
Figure 28:
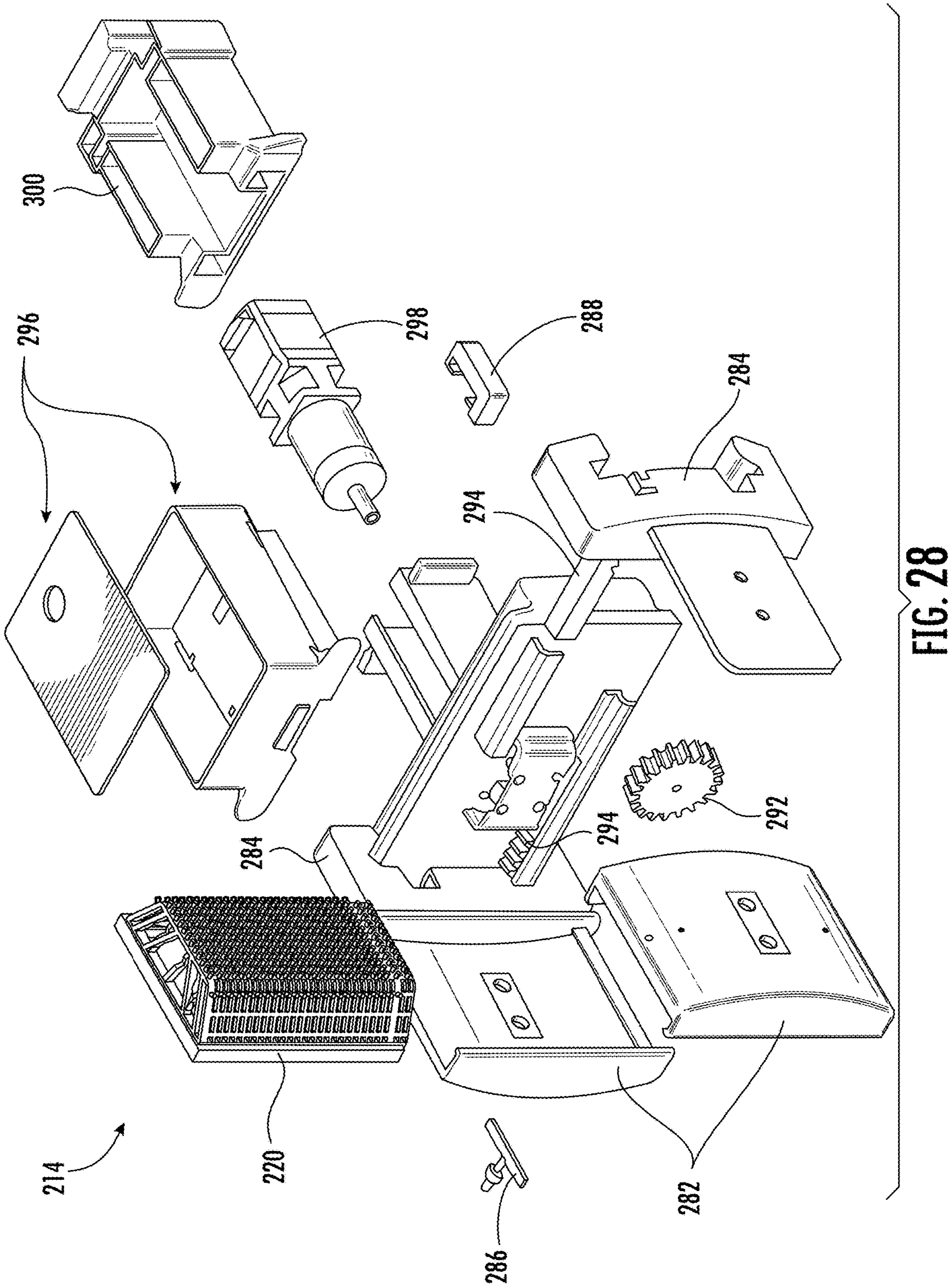
FIG. 28 provides an exploded view of the exemplary end effector of FIG. 27.
Figure 29:
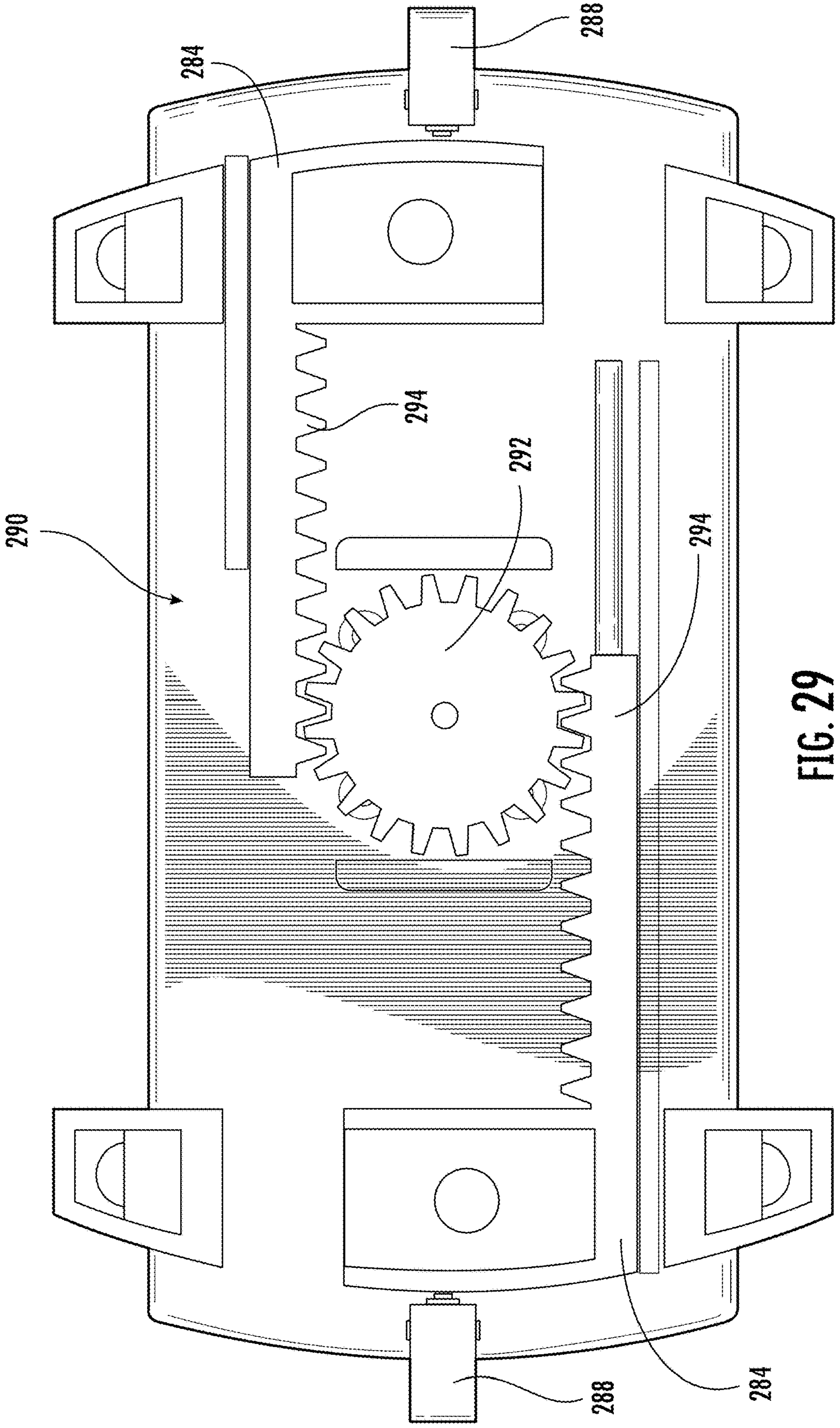
FIG. 29 provides an end view of a portion of the exemplary end effector of FIG. 27.

Turning now to FIGS. 27-33, in some embodiments, the end effector 214 may be a shell gripper, e.g., the gripper 214 may include a first hollow shell 282 coupled to a first handle 284 and a second hollow shell 282 coupled to a second handle 284. In such embodiments, the first hollow shell 282 and the first handle 284 may be mirrored with the second hollow shell 282 and the second handle 284. As mentioned, the gripper 214 may include a pair of compressible elements 220, such as a first compressible element 220 of the pair of opposing compressible elements 220 mounted in the first hollow shell 282 and a second compressible element 220 of the pair of opposing compressible elements 220 mounted in the second hollow shell 282. In such embodiments, e.g., as illustrated in FIG. 29, the gripper 214 may further include a rack and pinion 290 (e.g., including rotary gear 292 and opposing linear gears 294) configured to move the first hollow shell 282 and the second hollow shell 282 between an open position and a closed position.

As may be seen in FIGS. 27 and 28, the gripper 214 may include a housing 300 and an actuator, e.g., motor 298, may be mounted in the housing 300. The motor 298 may be coupled to the rotary gear 292 in order to actuate the rack and pinion 290, e.g., the rotary gear 292 may be mounted on a drive shaft of the motor 298 such that the motor 298 can drive rotation of the rotary gear 292. Each shell 282 may be mounted on a respective handle 284, and the linear gears 294 of the rack and pinion 290 may extend from each handle 284. The shells 282 may be hollow, whereby a compressible element 220 may be received in and over the hollow portion of each shell 282. In such embodiments, the gripper 214 may also include a lock 286 for retraining the compressible element 220 in the shell 282. A rubber bumper or stop 288 may be provided at an outermost side of each handle 284.

A controller, e.g., an integrated circuit such as printed circuit board (PCB), including one or more processing devices, memory, etc., as described above with respect to the controller of the UAV, may be positioned within a controller case 296, and the controller of the gripper 214 may be in operative communication with components of the gripper 214, such as the motor 298, to direct operation thereof, e.g., to cause the rotary gear 292 of the rack and pinion 290 to be driven and thereby open and/or close the gripper 214 by moving the shells 282 together or apart.

FIG. 29 provides a section view through the exemplary end effector, e.g., gripper, 214 of FIGS. 27 and 28, in order to illustrate the rack and pinion 290 in an assembled position. As may be seen, e.g., in FIG. 29, the rack and pinion 290 may be configured to open the gripper 214 by moving the shells 282 apart from each other, e.g., in generally opposite linear directions, when the rotary gear 292 is rotated in a first direction, e.g., clockwise on the page in FIG. 29, and to close the gripper 214 by moving the shells 282 towards each other when the rotary gear 292 is rotated in a second direction opposite the first direction, e.g., counterclockwise on the page in FIG. 29.

Figure 30:
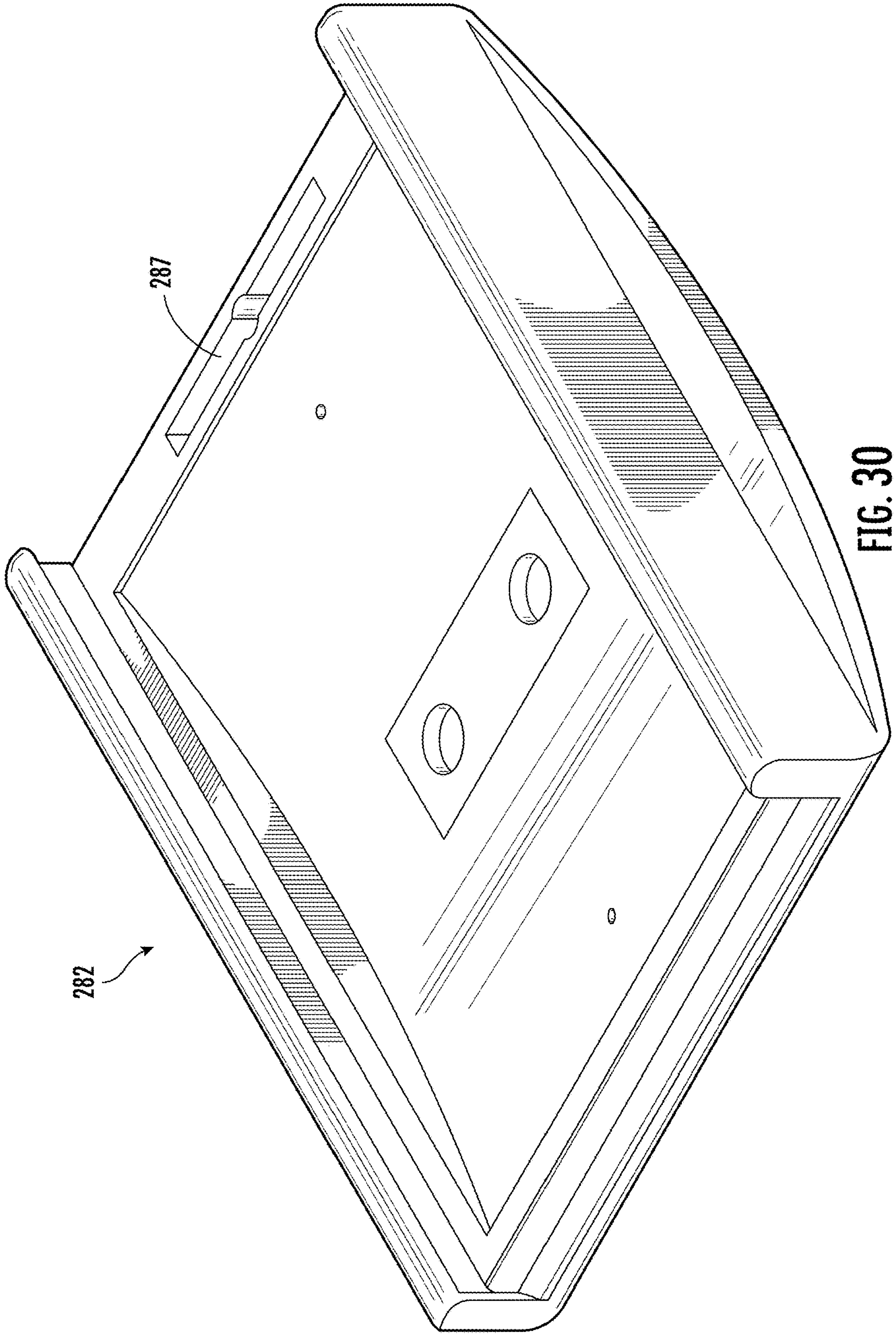
FIG. 30 provides a perspective view of a shell of the exemplary end effector of FIG. 27.
Figure 31:
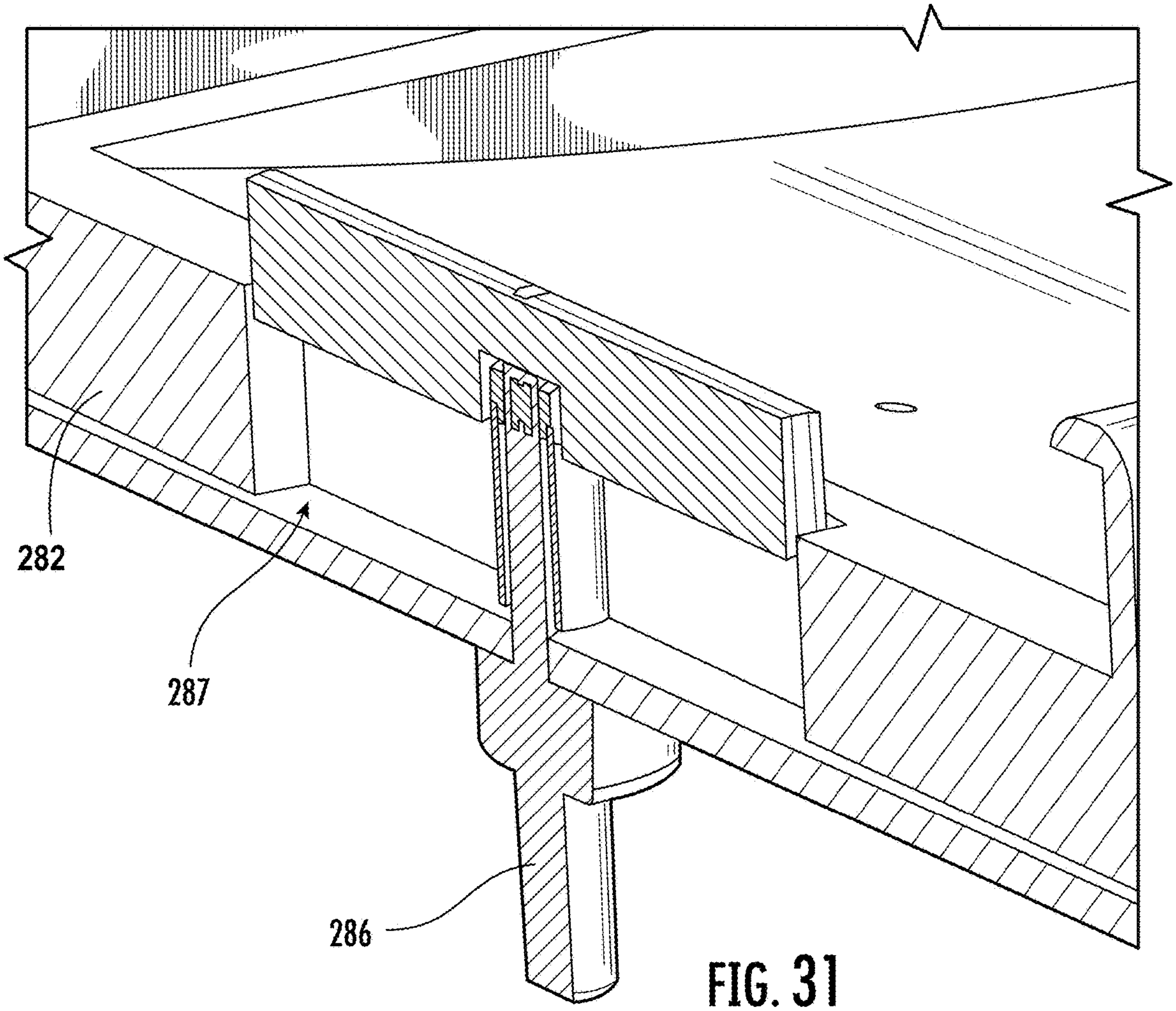
FIG. 31 provides a sectioned perspective view of the shell of FIG. 30 and a lock according to one or more exemplary embodiments of the present disclosure.
Figure 32:
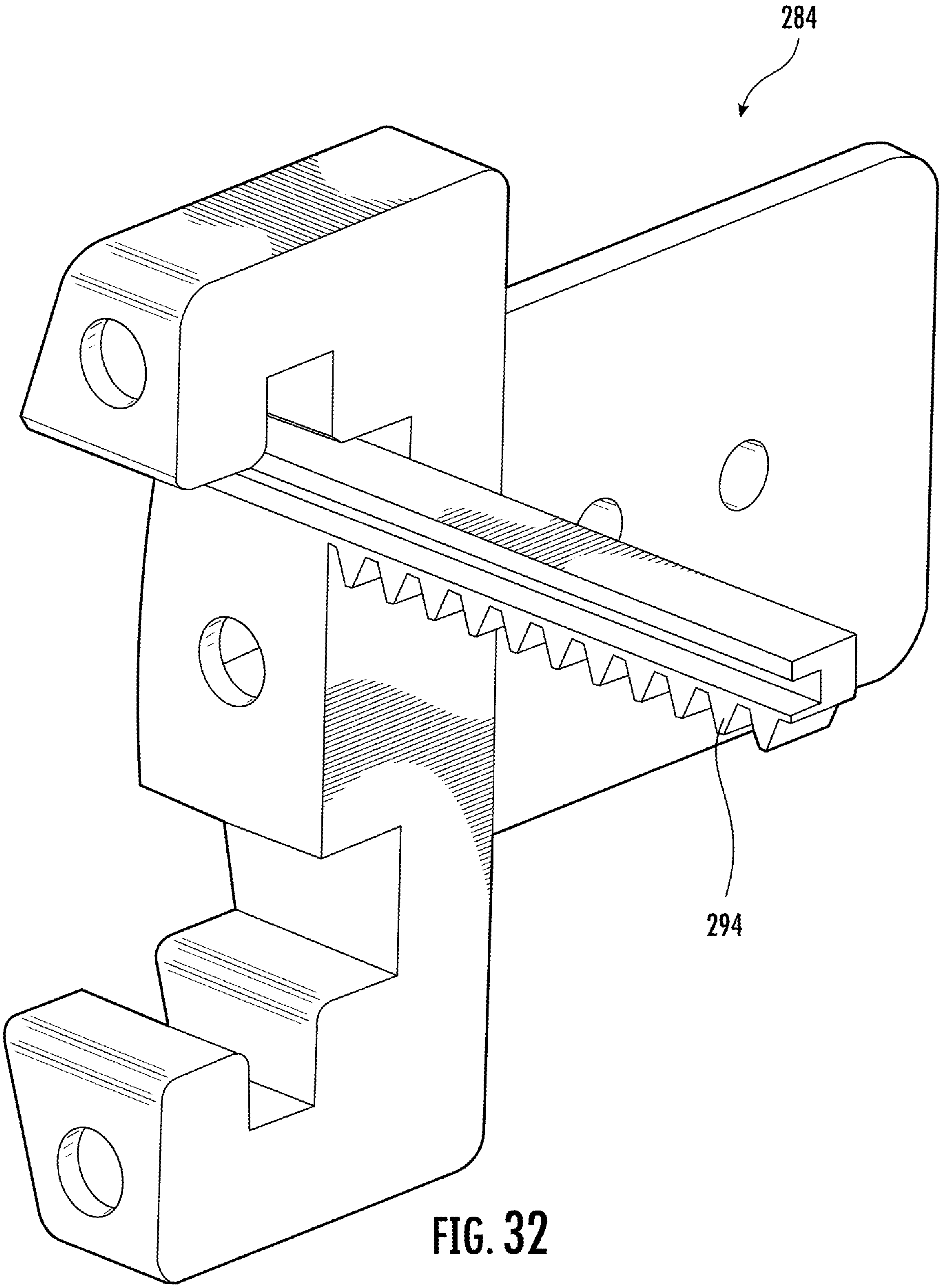
FIG. 32 provides a perspective view of a handle of the exemplary end effector of FIG. 27.
Figure 33:
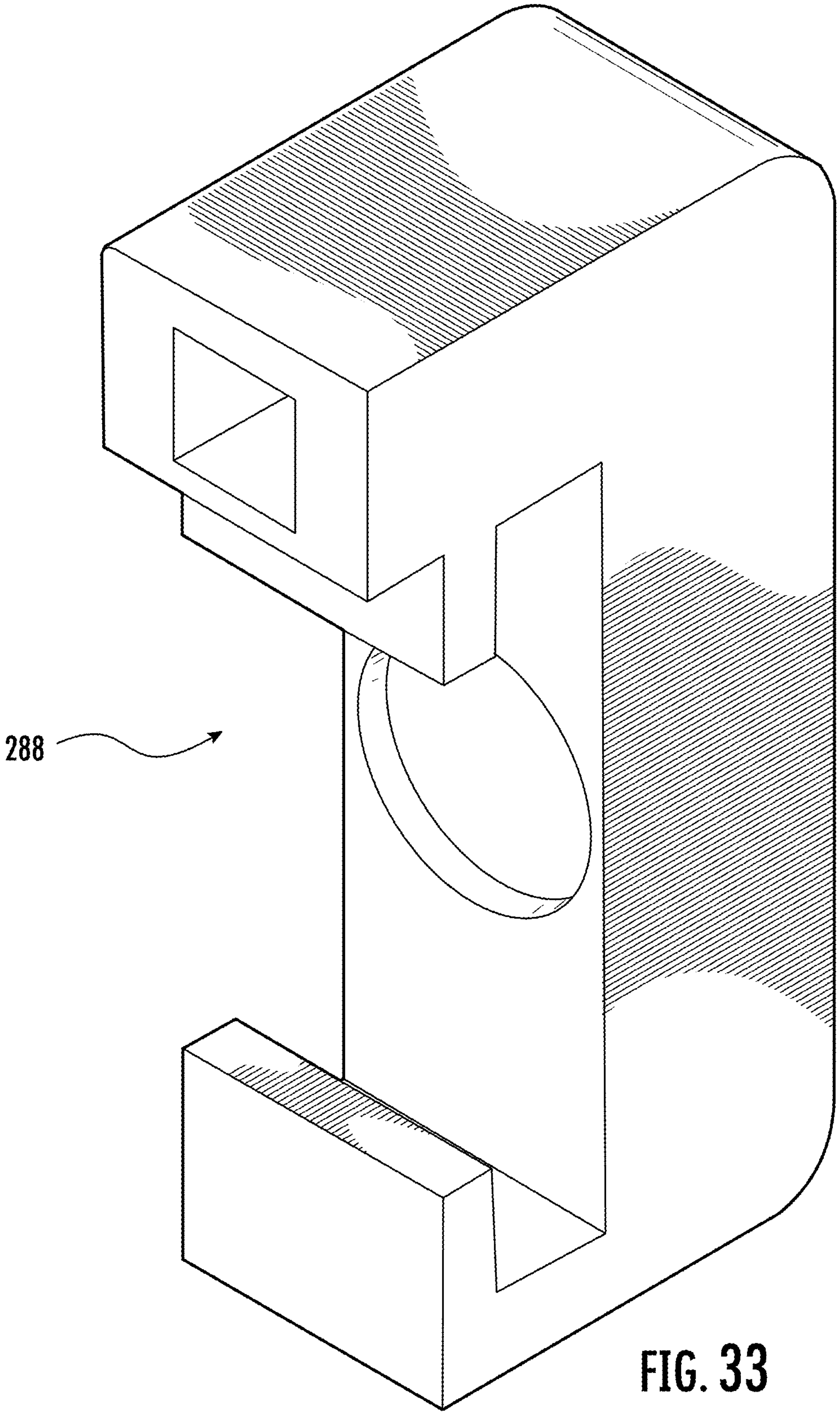
FIG. 33 provides a perspective view of a stop of the exemplary end effector of FIG. 27.

FIG. 30 provides a perspective view of an exemplary hollow shell 282 of the gripper 214, and FIG. 31 illustrates a sectioned perspective view of a portion of the exemplary hollow shell 282. In particular, as may be seen in FIG. 30, the hollow shell 282 may include a slot 287 defined in a perimetrical wall of the hollow shell 282. As may be seen, e.g., in FIG. 31, the lock 286 may extend into and through the slot 287 in the shell 282, such that the lock 286 may engage the compressible element 220 (see, e.g., FIGS. 27 and 28) to secure the compressible element 220 in place within the hollow shell 282. Additional perspective views are provided of an exemplary handle 284 in FIG. 32 and of an exemplary rubber stop 288 in FIG. 33.

Figure 34:
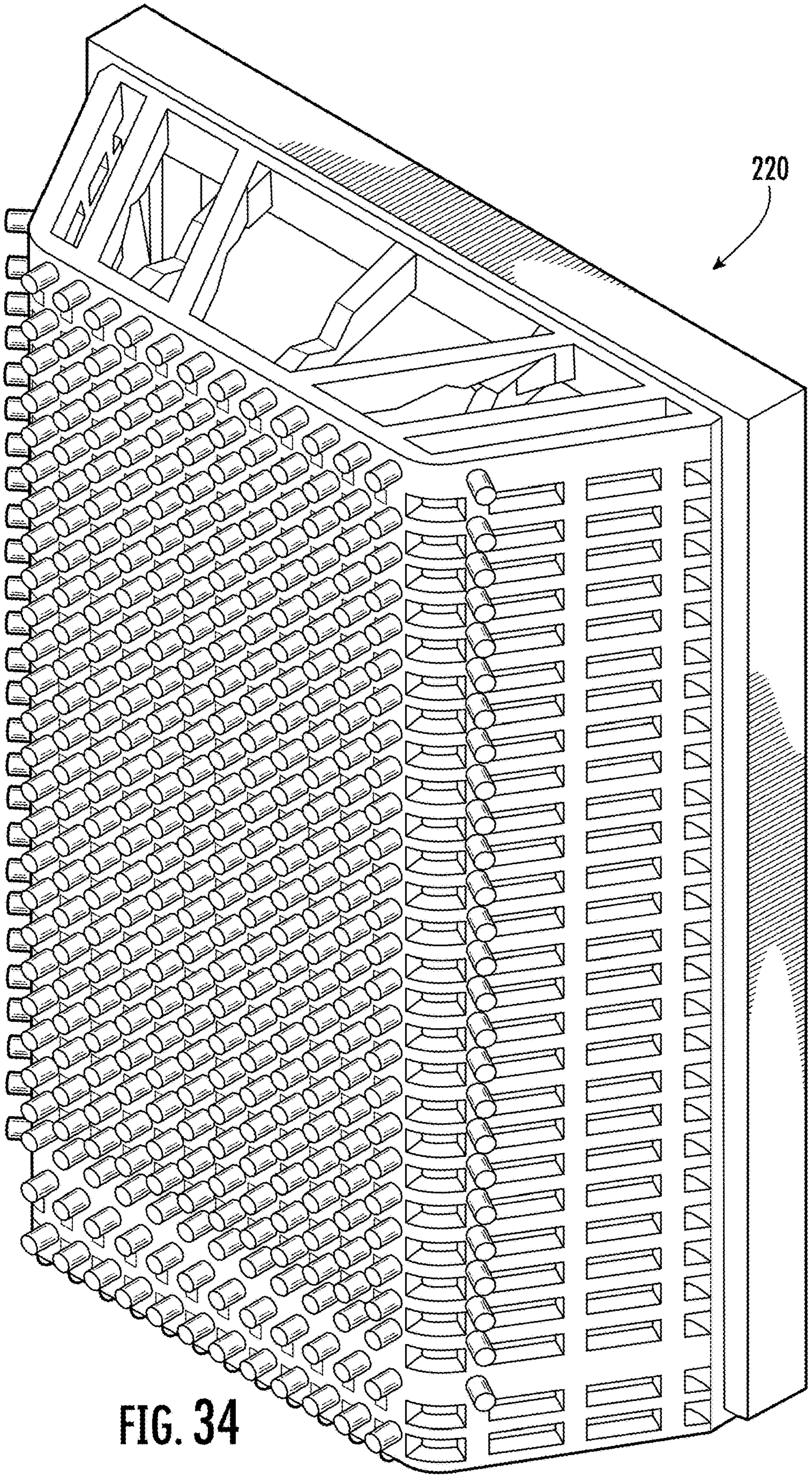
FIG. 34 provides a perspective view of an exemplary compressible element for an end effector according to one or more exemplary embodiments of the present disclosure.
Figure 35:
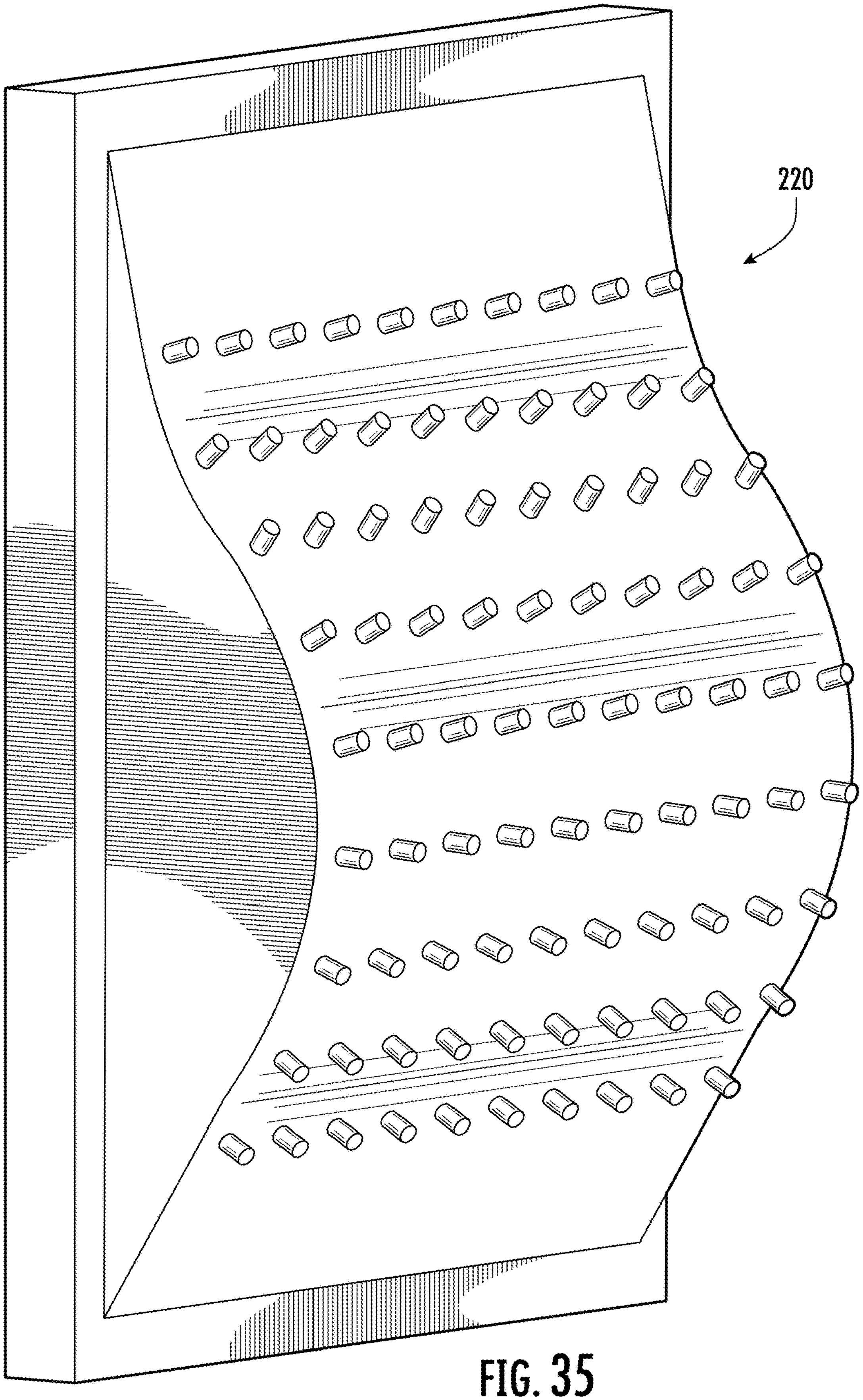
FIG. 35 provides a perspective view of another exemplary compressible element for an end effector according to one or more additional exemplary embodiments of the present disclosure.

As mentioned above, various compressible elements 220 may be provided with either the compliant gripper (e.g., FIGS. 23-25), or the shell gripper (e.g., FIGS. 27-33), and some examples of possible complaint grippers are illustrated in perspective views in FIGS. 34 and 35. For example, the compressible element 220 may include mesh pattern and a rectangular shape, as illustrated in FIG. 34, which may be suitable for gripping relatively large, flat objects. As another example, the compressible element 220 may include a curved shape, such as the exemplary compressible element 220 illustrated in FIG. 34, which may be suitable for gripping curved, e.g., cylindrical, objects.

Figure 36:
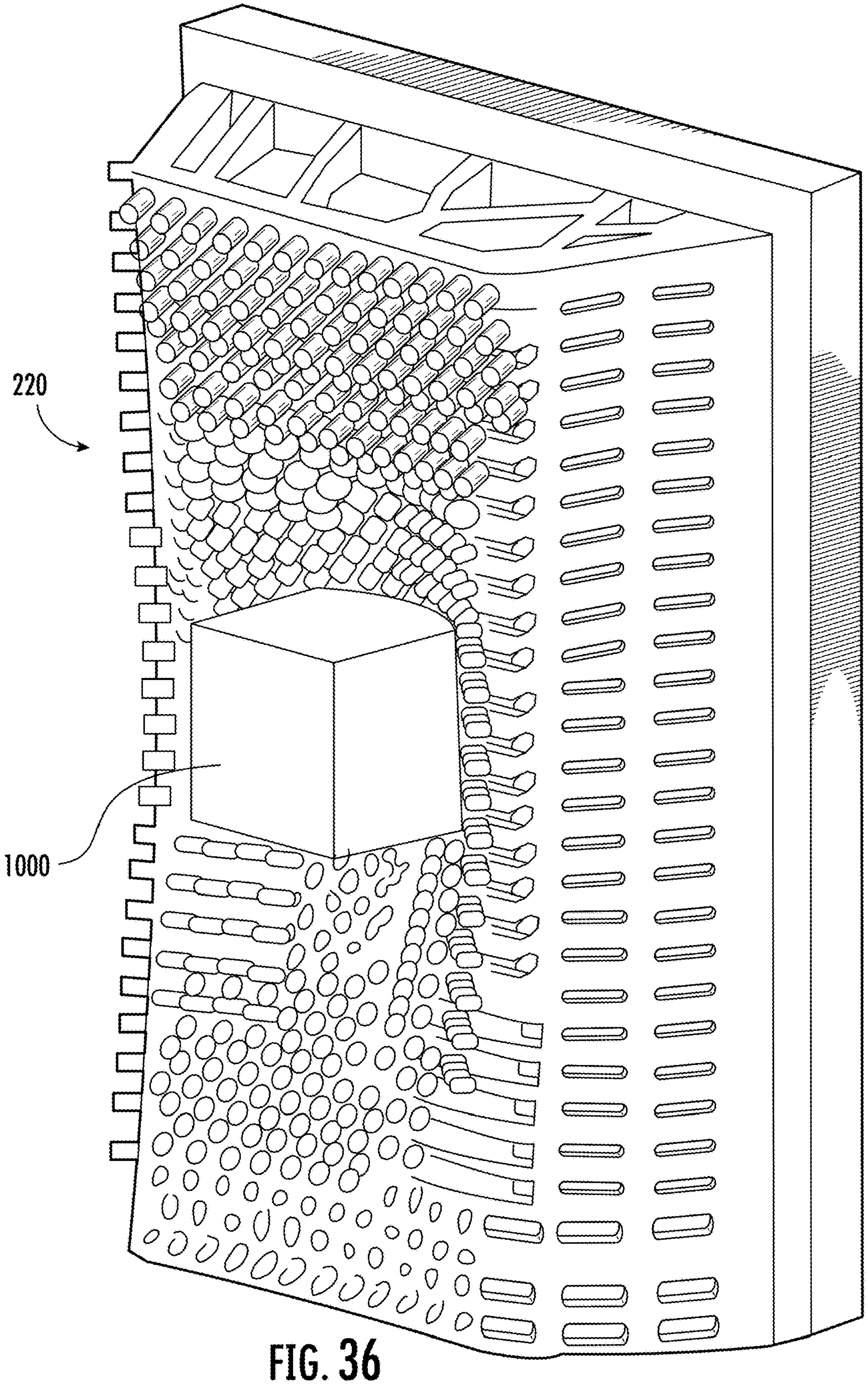
FIG. 36 provides a perspective view of the compressible element of FIG. 34 in a first compressed state, e.g., when engaging a first object.
Figure 37:
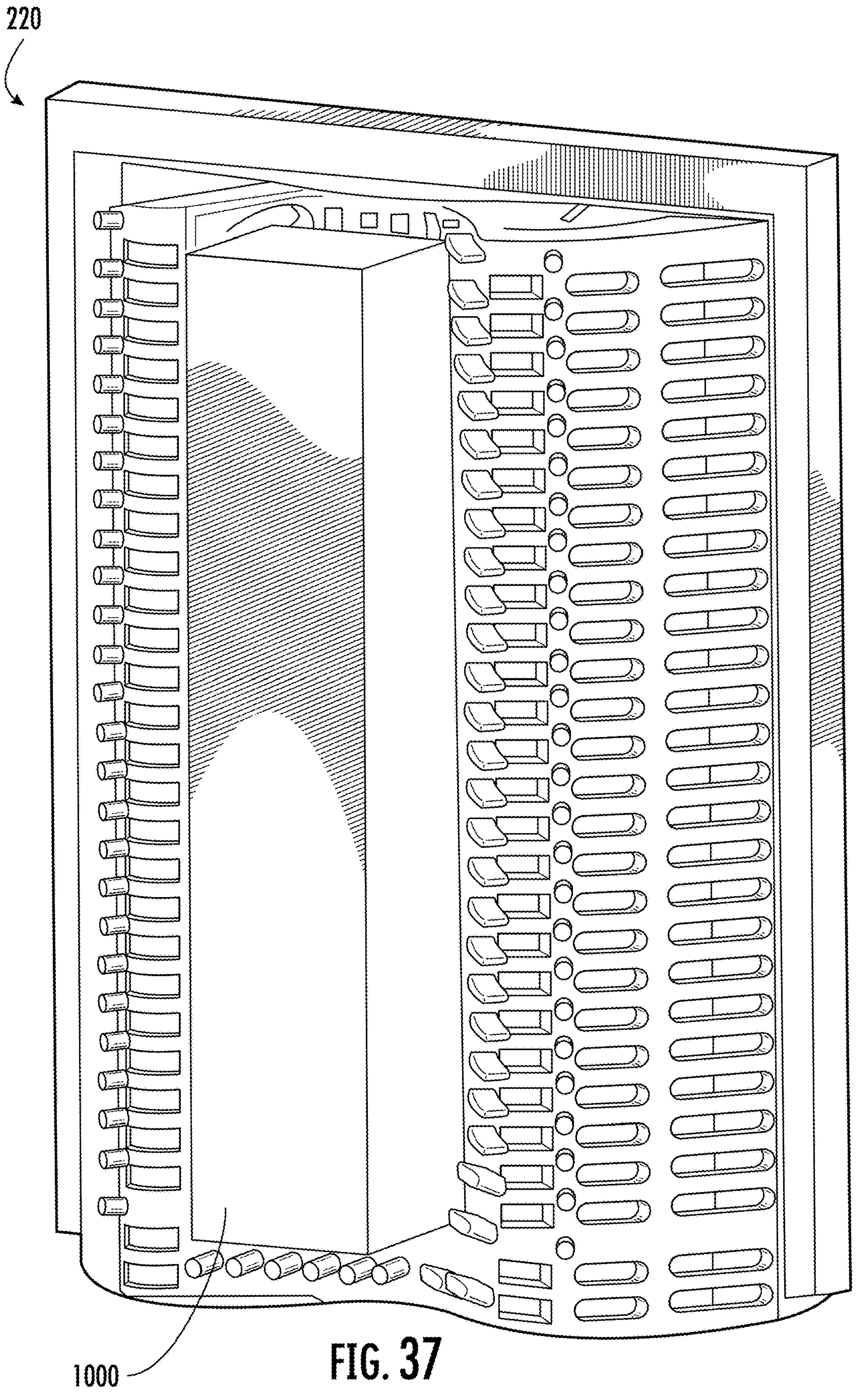
FIG. 37 provides a perspective view of the compressible element of FIG. 34 in a second compressed state, e.g., when engaging a second object.
Figure 38:
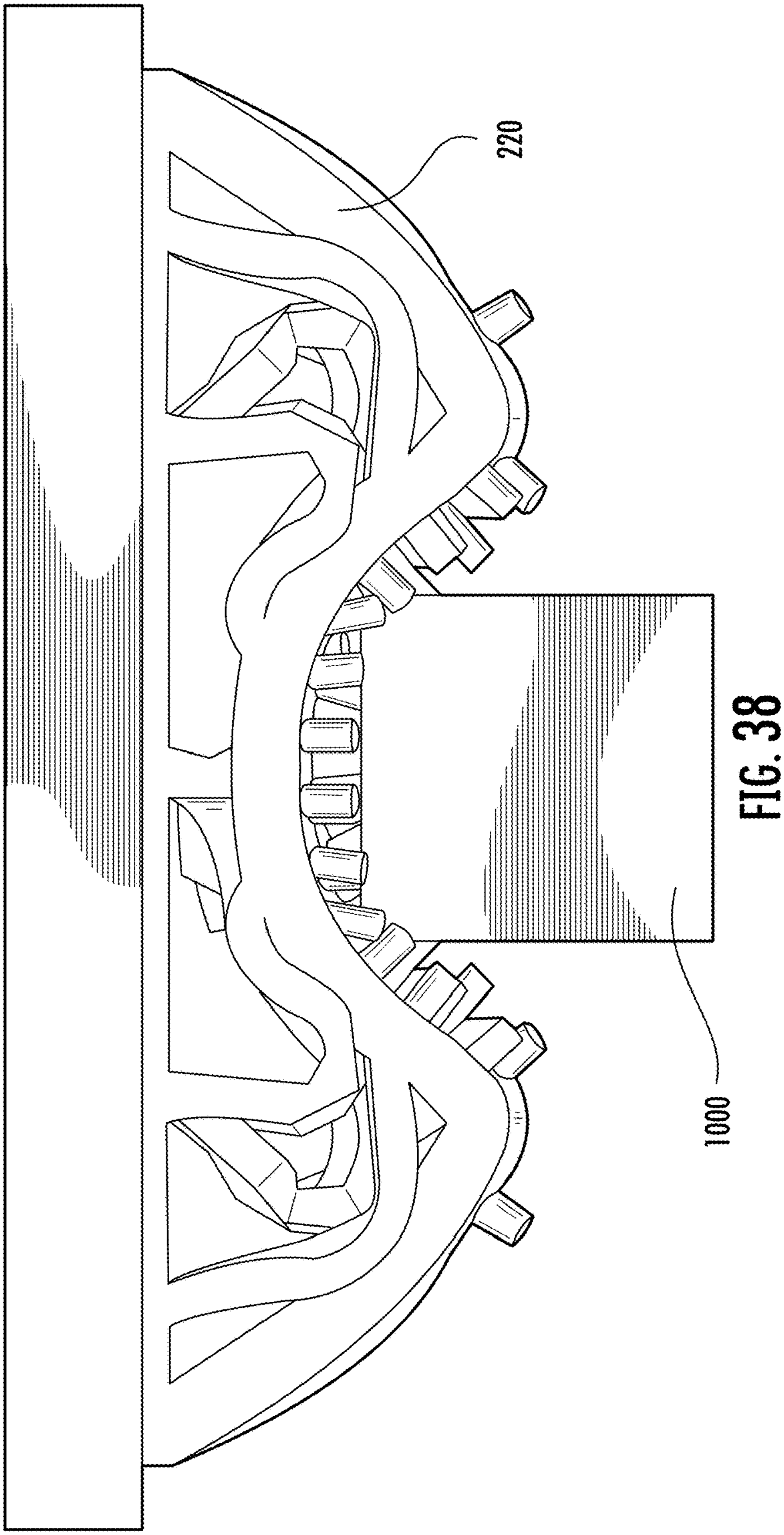
FIG. 38 provides a top view of the compressible element of FIG. 34 in the second compressed state, e.g., when engaging the second object.

Additional exemplary compressible elements 220 are illustrated in FIGS. 36, 37, and 38. As may be seen in FIGS. 36-38, the compressible element 220 may flex around and/or about an object 1000 to be gripped, including objects 1000 of various sizes, such that the compressible element 220 provides increased contact area with the object 1000 being gripped for improved engagement and holding of the object 1000 within the gripper 214. Additionally, the compressible element 220 may yield to the more rigid object 1000 be gripped, thereby reducing or preventing damage to the object 1000 from the pressure of the gripper.

Figure 39:
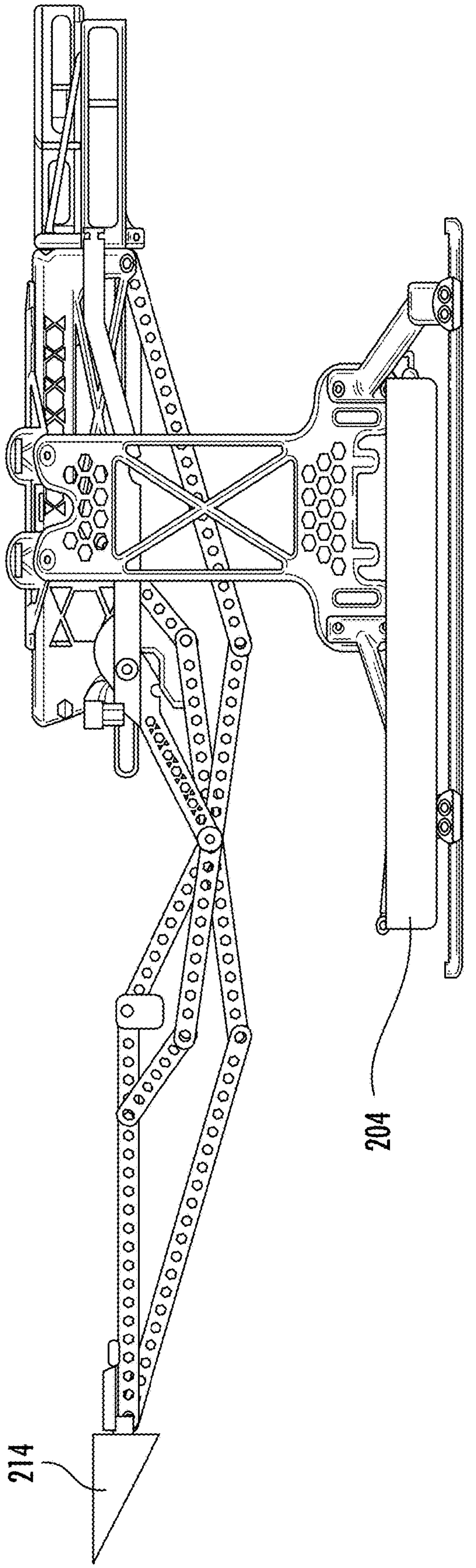
FIG. 39 provides a side view of a mechanism for a UAV according to one or more embodiments of the present disclosure, where the mechanism includes an exemplary liquid container and spraying end effector.
Figure 40:
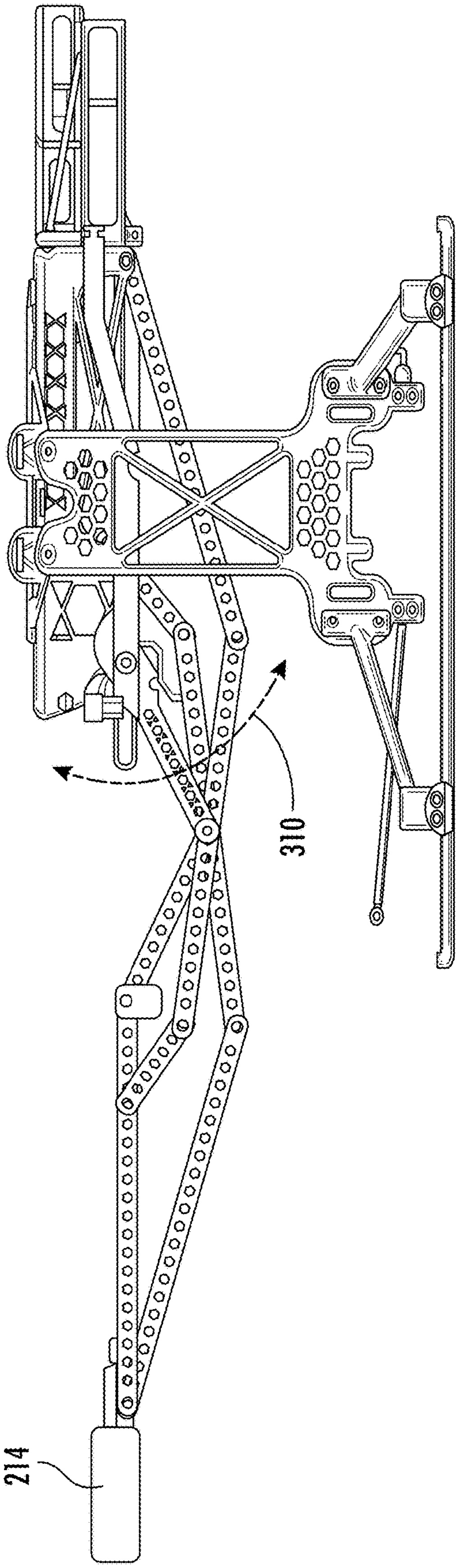
FIG. 40 provides a side view of a mechanism for a UAV according to one or more additional embodiments of the present disclosure.

As mentioned, various end effectors 214 may be provided with the exemplary mechanism 200 of the present disclosure. As an example, e.g., as illustrated in FIG. 39, a spraying end effector 214 may be provided. The storage system 204 may also be provided in various forms, such as a tank or other liquid container, e.g., as illustrated in FIG. 39. In additional embodiments, the storage system 204 may be movable, e.g., may be coupled to the actuation mechanism 252 whereby the storage system 204 moves upward and/or forward when the arm 210 retracts to bring the storage system 204 closer to the end effector 214 for easier and more reliable transfer of objects from the end effector, e.g., gripper, 214 to the storage system 204.

In some exemplary embodiments, the folding robotic arm 210 may be positioned and oriented at an oblique angle to the body 102 of the UAV 100, such as the folding robotic arm 210 may fold and unfold along a single linear direction or axis, and the single linear direction or axis may be oriented along an angle that is oblique to the vertical direction and/or oblique to the body 102 of the UAV 100. For example, in some embodiments, the arm 210 may be movable along an arc 310 to provide an adjustable angle, e.g., up or down, relative to the remainder of the mechanism 200 and/or a UAV 100 attached thereto, in order to provide movement of the folding robotic arm 210 between the retracted and extended positions at an oblique angle to the body 102.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A mechanism for an unmanned aerial vehicle, the unmanned aerial vehicle comprising a body and at least one rotor coupled to the body, the body comprising an upper side and a lower side opposite the upper side, the rotor configured to generate lift in an upward direction, the mechanism configured to mount to the lower side of the body, the mechanism comprising:

a landing gear, the landing gear extending between a pair of skids at a bottom end of the mechanism and a connector at a top end of the mechanism, the connector configured to couple to the lower side of the body of the unmanned aerial vehicle;

a storage system coupled to the landing gear proximate the pair of skids;

a robotic arm housing mounted to the landing gear at a bottom side of the connector;

a counterweight housing adjacent to the robotic arm housing;

a robotic arm movably mounted to the robotic arm housing, the robotic arm movable between a retracted position wherein the robotic arm is folded within the robotic arm housing and an extended position wherein the robotic arm is unfolded and a distal end of the robotic arm is spaced apart from the robotic arm housing in front of the robotic arm housing;

an actuator coupled to the robotic arm to move the robotic arm between the retracted position and the extended position; and an end effector coupled to the distal end of the robotic arm, the end effector comprising a gripper with a pair of opposing compressible elements for gripping an object between the pair of compressible elements.

2. The mechanism of claim 1, wherein the robotic arm is configured to move from the retracted position to the extended position such that the distal end of the robotic arm moves along a single straight line.

3. The mechanism of claim 1, wherein the actuator is also coupled to the counterweight housing, whereby the actuator is configured to move the counterweight housing backwards when the robotic arm moves forwards.

4. The mechanism of claim 1, wherein the actuator is coupled to the robotic arm via an actuation mechanism.

5. The mechanism of claim 4, wherein the actuation mechanism comprises a scotch yoke.

6. The mechanism of claim 5, wherein the actuator is also coupled to the counterweight housing via the scotch yoke, whereby the actuator is configured to move the counterweight housing in a direction opposite the robotic arm when the robotic arm moves between the retracted position and the extended position.

7. The mechanism of claim 1, wherein the gripper is a compliant gripper comprising a push rod, the compliant gripper configured to move from an open position to a closed position in response to pressure on the push rod.

8. The mechanism of claim 1, wherein the gripper comprises a first hollow shell coupled to a first handle, and a second hollow shell coupled to a second handle, wherein the first hollow shell and the first handle are mirrored with the second hollow shell and the second handle, a first compressible element of the pair of opposing compressible elements mounted in the first hollow shell, and a second compressible element of the pair of opposing compressible elements mounted in the second hollow shell, and wherein the gripper further comprises a rack and pinion configured to move the first hollow shell and the second hollow shell between an open position and a closed position.

9. The mechanism of claim 1, wherein the robotic arm comprises a linkage, and wherein each link in the linkage comprises an internal open web.

10. The mechanism of claim 1, wherein the storage system comprises a frame coupled to the landing gear and a net mounted on the frame.

11. A mechanism for an unmanned aerial vehicle, the unmanned aerial vehicle comprising a body and at least one rotor coupled to the body, the body comprising an upper side and a lower side opposite the upper side, the rotor configured to generate lift in an upward direction, the mechanism configured to mount to the lower side of the body, the mechanism comprising:

a landing gear extending between a bottom end of the mechanism and a connector at a top end of the mechanism, the connector configured to couple to the lower side of the body of the unmanned aerial vehicle;

a storage system coupled to the landing gear proximate the bottom end of the mechanism, the storage system comprising a frame coupled to the landing gear and a net mounted on the frame;

a robotic arm housing mounted to the landing gear at a bottom side of the connector;

a counterweight housing adjacent to the robotic arm housing;

a robotic arm movably mounted to the robotic arm housing, the robotic arm movable between a retracted position wherein the robotic arm is folded within the robotic arm housing and an extended position wherein the robotic arm is unfolded and a distal end of the robotic arm is spaced apart from the robotic arm housing in front of the robotic arm housing;

an actuator coupled to the robotic arm to move the robotic arm between the retracted position and the extended position; and an end effector coupled to the distal end of the robotic arm, the end effector comprising a gripper with a pair of opposing compressible elements for gripping an object between the pair of compressible elements.

12. The mechanism of claim 11, wherein the robotic arm is configured to move from the retracted position to the extended position such that the distal end of the robotic arm moves along a single straight line.

13. The mechanism of claim 11, wherein the actuator is also coupled to the counterweight housing, whereby the actuator is configured to move the counterweight housing backwards when the robotic arm moves forwards.

14. The mechanism of claim 11, wherein the actuator is coupled to the robotic arm via an actuation mechanism.

15. The mechanism of claim 14, wherein the actuation mechanism comprises a scotch yoke.

16. The mechanism of claim 15, wherein the actuator is also coupled to the counterweight housing via the scotch yoke, whereby the actuator is configured to move the counterweight housing in a direction opposite the robotic arm when the robotic arm moves between the retracted position and the extended position.

17. The mechanism of claim 11, wherein the gripper is a compliant gripper comprising a push rod, the compliant gripper configured to move from an open position to a closed position in response to pressure on the push rod.

18. The mechanism of claim 11, wherein the gripper comprises a first hollow shell coupled to a first handle, and a second hollow shell coupled to a second handle, wherein the first hollow shell and the first handle are mirrored with the second hollow shell and the second handle, a first compressible element of the pair of opposing compressible elements mounted in the first hollow shell, and a second compressible element of the pair of opposing compressible elements mounted in the second hollow shell, and wherein the gripper further comprises a rack and pinion configured to move the first hollow shell and the second hollow shell between an open position and a closed position.

19. The mechanism of claim 11, wherein the robotic arm comprises a linkage, and wherein each link in the linkage comprises an internal open web.

* * * * *